(12) United States Patent
Fattal et al.

(10) Patent No.: US 10,969,627 B2
(45) Date of Patent: Apr. 6, 2021

(54) MODE-SELECTABLE BACKLIGHT, PRIVACY DISPLAY, AND METHOD

(71) Applicant: LEIA INC., Menlo Park, CA (US)

(72) Inventors: David A. Fattal, Mountain View, CA (US); Ming Ma, Palo Alto, CA (US); Xuejian Li, Menlo Park, CA (US)

(73) Assignee: LEIA INC., Menlo Park, CA (US)

( * ) Notice: Subject to any disclaimer, the term of this patent is extended or adjusted under 35 U.S.C. 154(b) by 0 days.

(21) Appl. No.: 16/907,239

(22) Filed: Jun. 20, 2020

(65) Prior Publication Data

US 2020/0319513 A1  Oct. 8, 2020

Related U.S. Application Data

(63) Continuation of application No. PCT/US2017/068037, filed on Dec. 21, 2017.

(51) Int. Cl.
*G02F 1/13357* (2006.01)
*G02F 1/13* (2006.01)
*G02F 1/1335* (2006.01)

(52) U.S. Cl.
CPC ...... *G02F 1/133606* (2013.01); *G02F 1/1323* (2013.01); *G02F 1/133509* (2013.01)

(58) Field of Classification Search
CPC ............. G02F 1/133606; G02F 1/1323; G02F 1/133509; G02F 1/133615;
(Continued)

(56) References Cited

U.S. PATENT DOCUMENTS 9,128,226 B2  9/2015  Fattal et al.
9,201,270 B2  12/2015  Fattal et al.
(Continued)

FOREIGN PATENT DOCUMENTS

JP  2017508265 A  3/2017
WO  WO-0133261 A1 *  5/2001  ....... G02F 1/133615
(Continued)

OTHER PUBLICATIONS

International Search Report and Written Opinion (ISRWO) from the International Searching Authority (ISA/KR) dated Sep. 18, 2018 (10 pages) for counterpart parent PCT Application No. PCT/US2017/068037.

(Continued)

*Primary Examiner* — Donald L Raleigh
(74) *Attorney, Agent, or Firm* — J. Michael Johnson

(57) ABSTRACT

A mode-selectable backlight and privacy display employ directional scattering features to provide emitted light. The mode-selectable backlight includes a light guide, a first directional scattering feature to provide broad-angle emitted light from guided light having a first propagation direction within the light guide during a public mode, and a second directional scattering feature to provide directional emitted light from guided light having a second propagation direction within the light guide during a privacy mode. The directional emitted light the provided during the privacy mode is directed into a viewbox. The mode-selectable privacy display further includes light sources configured to provide the guided light having the first and second propagation directions along with an array of light valves configured to modulate the broad-angle emitted light as a public image and the directional emitted light as a private image visible within the viewbox.

20 Claims, 7 Drawing Sheets

(58) Field of Classification Search
CPC ............ G02F 1/133626; G02F 1/1336; G02B 6/0068; G02B 6/0035; G02B 6/0051; G02B 6/0038; G02B 6/0078
See application file for complete search history.

(56) References Cited

U.S. PATENT DOCUMENTS

| | | | |
|---|---|---|---|
| 9,298,168 | B2 | 3/2016 | Taff et al. |
| 9,389,415 | B2 | 7/2016 | Fattal et al. |
| 9,459,461 | B2 | 10/2016 | Santori et al. |
| 9,557,466 | B2 | 1/2017 | Fattal |
| 9,785,119 | B2 | 10/2017 | Taff et al. |
| 9,881,531 | B2 | 1/2018 | Klippstein et al. |
| 10,551,546 | B2 | 2/2020 | Fattal |
| 10,649,128 | B2 | 5/2020 | Fattal et al. |
| 2006/0291240 | A1 | 12/2006 | Kim et al. |
| 2013/0148056 | A1 | 6/2013 | Hineno et al. |
| 2017/0329149 | A1 | 11/2017 | Fattal |
| 2017/0363794 | A1 | 12/2017 | Wan |
| 2018/0024289 | A1 | 1/2018 | Fattal |
| 2018/0156963 | A1 | 6/2018 | Fattal |
| 2018/0188691 | A1 | 7/2018 | Fattal |
| 2018/0259799 | A1 | 9/2018 | Kroon |
| 2019/0018186 | A1 | 1/2019 | Fattal |
| 2019/0155105 | A1 | 5/2019 | Aieta et al. |
| 2020/0005718 | A1 | 1/2020 | Fattal |
| 2020/0018886 | A1 | 1/2020 | Fattal et al. |
| 2020/0018891 | A1 | 1/2020 | Fattal et al. |

FOREIGN PATENT DOCUMENTS

| | | |
|---|---|---|
| WO | 2012038856 A1 | 3/2012 |
| WO | 2016160048 A1 | 10/2016 |
| WO | 2017050631 A1 | 3/2017 |
| WO | 2017131816 A1 | 8/2017 |
| WO | 2019125390 A1 | 6/2019 |

OTHER PUBLICATIONS

Fattal, David et al., "A multi-directional backlight for a wide-angle, glasses-free three-dimensional display," Nature, Mar. 21, 2013, pp. 348-351, vol. 495, Macmillan Publishers Limited, 2013.

Reichelt et al.,"Holographic 3-D Displays—Electro-holography within the Grasp of Commercialization," Advances in Lasers and Electro-Optics, Optics, Nelson Costa and Adolfo Cartaxo (Ed.), (2010), pp. 683-711, ISBN: 978-953-307-088-9, InTech, Available from: http://www.intechopen.com/books/advances-in-lasers-and-electro-optics/holographic-3-ddisplays-electro-holography-within-the-grasp-of-commercialization.

Travis et al, "Collimated light from a waveguide for a display backlight," Optics Express, Oct. 2009, pp. 19714-19719, vol. 17, No. 22.

Xu et al., "Computer-Generated Holography for Dynamic Display of 3D Objects with Full Parallax," International Journal of Virtual Reality, 2009, pp. 33-38, vol. 8, No. 2.

Son, Jung-Young et al., "Three-Dimensional Imaging Methods Based on Multiview Images," IEEE/OSA Journal of Display Technology, Sep. 2005, pp. 125-140, vol. 1, No. 1.

Kee, Edwin., "Hitachi Full Parallax 3D Display Offers Mind Bending Visuals," http://www.ubergizmo.com/2011/10/hitachi-full-parallax-3d-display-offers-mind-bending-visuals, Oct. 4, 2011, 2 pages.

* cited by examiner

MODE-SELECTABLE BACKLIGHT, PRIVACY DISPLAY, AND METHOD

CROSS-REFERENCE TO RELATED APPLICATIONS

This application is a continuation application of and claims the benefit of priority to International Application No. PCT/US2017/068037, filed Dec. 21, 2017, the entire contents of which is incorporated herein by reference.

STATEMENT REGARDING FEDERALLY SPONSORED RESEARCH OR DEVELOPMENT

N/A

BACKGROUND

Electronic displays are a nearly ubiquitous medium for communicating information to users of a wide variety of devices and products. Most commonly employed electronic displays include the cathode ray tube (CRT), plasma display panels (PDP), liquid crystal displays (LCD), electroluminescent displays (EL), organic light emitting diode (OLED) and active matrix OLEDs (AMOLED) displays, electrophoretic displays (EP) and various displays that employ electromechanical or electrofluidic light modulation (e.g., digital micromirror devices, electrowetting displays, etc.). Generally, electronic displays may be categorized as either active displays (i.e., displays that emit light) or passive displays (i.e., displays that modulate light provided by another source). Among the most obvious examples of active displays are CRTs, PDPs and OLEDs/AMOLEDs. Displays that are typically classified as passive when considering emitted light are LCDs and EP displays. Passive displays, while often exhibiting attractive performance characteristics including, but not limited to, inherently low power consumption, may find somewhat limited use in many practical applications given the lack of an ability to emit light.

To overcome the limitations of passive displays associated with emitted light, many passive displays are coupled to an external light source. The coupled light source may allow these otherwise passive displays to emit light and function substantially as an active display. Examples of such coupled light sources are backlights. A backlight may serve as a source of light (often a panel backlight) that is placed behind an otherwise passive display to illuminate the passive display. For example, a backlight may be coupled to an LCD or an EP display. The backlight emits light that passes through the LCD or the EP display. The light emitted is modulated by the LCD or the EP display and the modulated light is then emitted, in turn, from the LCD or the EP display. Often backlights are configured to emit white light. Color filters are then used to transform the white light into various colors used in the display. The color filters may be placed at an output of the LCD or the EP display (less common) or between the backlight and the LCD or the EP display, for example.

BRIEF DESCRIPTION OF THE DRAWINGS

Various features of examples and embodiments in accordance with the principles described herein may be more readily understood with reference to the following detailed description taken in conjunction with the accompanying drawings, where like reference numerals designate like structural elements, and in which.

Figure 1:
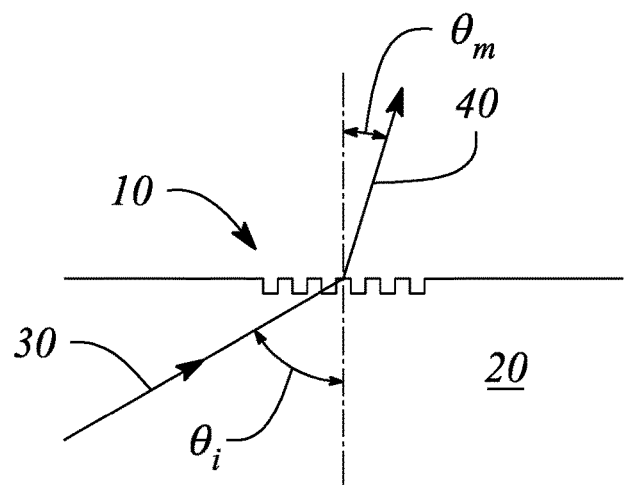
FIG. 1 illustrates a cross sectional view of a diffraction grating in an example, according to an embodiment consistent with the principles described herein.

Certain examples and embodiments have other features that are one of in addition to and in lieu of the features illustrated in the above-referenced figures. These and other features are detailed below with reference to the above-referenced figures.

DETAILED DESCRIPTION

Examples and embodiments in accordance with the principles described herein provide mode-selectable backlighting with application to a mode-selectable privacy display. In particular, embodiments consistent with the principles described herein provide a mode-selectable backlight employing a plurality of directional scattering features configured to provide emitted light by scattering out of a light guide a portion of guided light propagating within the light guide. Characteristics of the emitted light are mode-selectable by controlling a propagation direction of the guided light during different operational modes (e.g., a public mode and a privacy mode), according to various embodiments. In addition, when used in conjunction with a display system, the mode-selectable backlight may support displaying an image or other information in one or both of a public mode for general viewing and a privacy mode that provides private viewing by a user, according to some embodiments.

For example, during a public mode, a first directional scattering feature of the directional scattering feature plurality may be configured to provide broad-angle emitted light from guided light having a first propagation direction within a light guide. Alternatively, a second directional scattering feature of the directional scattering feature plurality may be configured to provide directional emitted light from guided light having a second propagation direction within the light guide, during a privacy mode. In some embodiments, the broad-angle emitted light may be, but is not limited to, light that is diffuse or substantially non-directional. On the other hand, the directional emitted light provided by the second directional scattering feature is configured to be directed into a viewbox adjacent to the mode-selectable backlight, according to various embodiments.

In some embodiments, the broad-angle emitted light may provide backlighting that supports or facilitates the display of a public image during the public mode. In the privacy mode, the directional emitted light may provide backlighting configured to support the display of a private image. Moreover, the private image is configured to be visible, and in some embodiments exclusively visible, within either or both of the viewbox or a viewing cone of the viewbox to provide viewing privacy. Uses of mode-selectable backlighting and mode-selectable privacy displays described herein include, but are not limited to, mobile telephones (e.g., smart phones), watches, tablet computes, mobile computers (e.g., laptop computers), personal computers and computer monitors, automobile display consoles, cameras displays, and various other mobile as well as substantially non-mobile display applications and devices.

Herein, a 'light guide' is defined as a structure that guides light within the structure using total internal reflection or 'TIR'. In particular, the light guide may include a core that is substantially transparent at an operational wavelength of the light guide. In various examples, the term 'light guide' generally refers to a dielectric optical waveguide that employs total internal reflection to guide light at an interface between a dielectric material of the light guide and a material or medium that surrounds that light guide. By definition, a condition for total internal reflection is that a refractive index of the light guide is greater than a refractive index of a surrounding medium adjacent to a surface of the light guide material. In some embodiments, the light guide may include a coating in addition to or instead of the aforementioned refractive index difference to further facilitate the total internal reflection. The coating may be a reflective coating, for example. The light guide may be any of several light guides including, but not limited to, one or both of a plate or slab guide and a strip guide.

Further herein, the term 'plate' when applied to a light guide as in a 'plate light guide' is defined as a piece-wise or differentially planar layer or sheet, which is sometimes referred to as a 'slab' guide. In particular, a plate light guide is defined as a light guide configured to guide light in two substantially orthogonal directions bounded by a top surface and a bottom surface (i.e., opposite surfaces) of the light guide. Further, by definition herein, the top and bottom surfaces are both separated from one another and may be substantially parallel to one another in at least a differential sense. That is, within any differentially small section of the plate light guide, the top and bottom surfaces are substantially parallel or co-planar.

In some embodiments, the plate light guide may be substantially flat (i.e., confined to a plane) and therefore, the plate light guide is a planar light guide. In other embodiments, the plate light guide may be curved in one or two orthogonal dimensions. For example, the plate light guide may be curved in a single dimension to form a cylindrical shaped plate light guide. However, any curvature has a radius of curvature sufficiently large to ensure that total internal reflection is maintained within the plate light guide to guide light.

Herein, a 'directional scattering feature' is defined a scattering structure that selectively or preferentially scatters light having a particular or predefined propagation direction, while either not scattering or substantially not scattering light having another or different propagation direction. For example, the directional scattering feature may be configured to selectively scatter light having first propagation direction. Further, the directional scattering feature may not scatter light having a second propagation direction that is different from the first propagation direction. As such the directional scattering feature is directionally selective with respect to a direction of light incident on the directional scattering feature, by definition.

Herein, an 'angle-preserving scattering feature' or equivalently an 'angle-preserving scatterer' is any feature or scatterer configured to scatter light in a manner that substantially preserves in scattered light an angular spread of light incident on the feature or scatterer. In particular, by definition, an angular spread $\sigma_s$ of light scattered by an angle-preserving scattering feature is a function of an angular spread $\sigma$ of the incident light (i.e., $\sigma_s = f(\sigma)$). In some embodiments, the angular spread $\sigma_s$ of the scattered light is a linear function of the angular spread or collimation factor $\sigma$ of the incident light (e.g., $\sigma_s = \alpha \cdot \sigma$, where $\alpha$ is an integer). That is, the angular spread $\sigma_s$ of light scattered by an angle-preserving scattering feature may be substantially proportional to the angular spread or collimation factor $\sigma$ of the incident light. For example, the angular spread $\sigma_s$ of the scattered light may be substantially equal to the incident light angular spread $\sigma$ (e.g., $\sigma_s \approx \sigma$). A uniform diffraction grating (i.e., a diffraction grating having a substantially uniform or constant diffractive feature spacing or grating pitch) is an example of an angle-preserving scattering feature. In contrast, a Lambertian scatterer or a Lambertian reflector as well as a general diffuser (e.g., having or approximating Lambertian scattering) are not angle-preserving scatterers, by definition herein.

Herein, a 'diffraction grating' is generally defined as a plurality of features (i.e., diffractive features) arranged to provide diffraction of light incident on the diffraction grating. In some examples, the plurality of features may be arranged in a periodic or quasi-periodic manner. For example, the diffraction grating may include a plurality of features (e.g., a plurality of grooves or ridges in a material surface) arranged in a one-dimensional (1D) array. In other examples, the diffraction grating may be a two-dimensional (2D) array of features. The diffraction grating may be a 2D array of bumps on or holes in a material surface, for example.

As such, and by definition herein, the 'diffraction grating' is a structure that provides diffraction of light incident on the diffraction grating. If the light is incident on the diffraction grating from a light guide, the provided diffraction or diffractive scattering may result in, and thus be referred to as, 'diffractive coupling' in that the diffraction grating may couple light out of the light guide by diffraction. The diffraction grating also redirects or changes an angle of the light by diffraction (i.e., at a diffractive angle). In particular, as a result of diffraction, light leaving the diffraction grating generally has a different propagation direction than a propagation direction of the light incident on the diffraction grating (i.e., incident light). The change in the propagation direction of the light by diffraction is referred to as 'diffractive redirection' herein. Hence, the diffraction grating may be understood to be a structure including diffractive features that diffractively redirects light incident on the diffraction grating and, if the light is incident from a light guide, the diffraction grating may also diffractively couple out the light from the light guide.

Further, by definition herein, the features of a diffraction grating are referred to as 'diffractive features' and may be one or more of at, in and on a material surface (i.e., a boundary between two materials). The surface may be a surface of a light guide, for example. The diffractive features may include any of a variety of structures that diffract light including, but not limited to, one or more of grooves, ridges, holes and bumps at, in or on the surface. For example, the diffraction grating may include a plurality of substantially parallel grooves in the material surface. In another example, the diffraction grating may include a plurality of parallel ridges rising out of the material surface. The diffractive features (e.g., grooves, ridges, holes, bumps, etc.) may have any of a variety of cross sectional shapes or profiles that provide diffraction including, but not limited to, one or more of a sinusoidal profile, a rectangular profile (e.g., a binary diffraction grating), a triangular profile and a saw tooth profile (e.g., a blazed grating).

According to various examples described herein, a diffraction grating may be employed to diffractively scatter or couple light out of a light guide (e.g., a plate light guide) as a light beam. In particular, a diffraction angle $\theta_m$ of or provided by a locally periodic diffraction grating may be given by equation (1) as:

$$\theta_m = \sin^{-1}\left(n \sin \theta_i - \frac{m\lambda}{d}\right) \quad (1)$$

where $\lambda$ is a wavelength of the light, m is a diffraction order, n is an index of refraction of a light guide, d is a distance or spacing between features of the diffraction grating, $\theta_i$ is an angle of incidence of light on the diffraction grating. For simplicity, equation (1) assumes that the diffraction grating is adjacent to a surface of the light guide and a refractive index of a material outside of the light guide is equal to one (i.e., $n_{out}=1$). In general, the diffraction order m is given by an integer. A diffraction angle $\theta_m$ of a light beam produced by the diffraction grating may be given by equation (1) where the diffraction order is positive (e.g., m>0). For example, first-order diffraction is provided when the diffraction order m is equal to one (i.e., m=1).

FIG. 1 illustrates a cross sectional view of a diffraction grating 10 in an example, according to an embodiment consistent with the principles described herein. For example, the diffraction grating 10 may be located on a surface of a light guide 20. In addition, FIG. 1 illustrates a light beam 30 incident on the diffraction grating 10 at an incident angle $\theta_i$. The incident light beam 30 may be a guided light beam within the light guide 20. Also illustrated in FIG. 1 is a directional light beam 40 diffractively produced and coupled-out by the diffraction grating 10 as a result of diffraction of the incident light beam 30. The directional light beam 40 has a diffraction angle $\theta_m$ (or 'principal angular direction' herein) as given by equation (1). The diffraction angle $\theta_m$ may correspond to a diffraction order 'm' of the diffraction grating 10, for example.

Herein a 'collimator' is defined as substantially any optical device or apparatus that is configured to collimate light. According to various embodiments, an amount of collimation provided by the collimator may vary in a predetermined degree or amount from one embodiment to another. A 'collimation factor' is defined herein as a degree to which light is collimated. In particular, a collimation factor delineates an angular spread of light rays within a collimated beam of light, by definition herein. For example, a collimation factor σ may specify that a majority of light rays in a beam of collimated light is within a particular angular spread (e.g., +/−σ a degrees about a central or principal angular direction of the collimated light beam). The light rays of the collimated light beam may have a Gaussian distribution in terms of angle and the angular spread may be an angle determined by at one-half of a peak intensity of the collimated light beam, according to some examples.

Herein, a 'light source' is generally defined as a source of light (e.g., an optical emitter configured to produce and emit light). For example, the light source may comprise an optical emitter such as a light emitting diode (LED) that emits light when activated or turned on. In particular, herein the light source may be substantially any source of light or comprise substantially any optical emitter including, but not limited to, one or more of a light emitting diode (LED), a laser, an organic light emitting diode (OLED), a polymer light emitting diode, a plasma-based optical emitter, a fluorescent lamp, an incandescent lamp, and virtually any other source of light. The light produced by the light source may have a color (i.e., may include a particular wavelength of light), or may be a range of wavelengths (e.g., white light). In some embodiments, the light source may comprise a plurality of optical emitters. For example, the light source may include a set or group of optical emitters in which at least one of the optical emitters produces light having a color, or equivalently a wavelength, that differs from a color or wavelength of light produced by at least one other optical emitter of the set or group. The different colors may include primary colors (e.g., red, green, blue) for example.

Herein, a 'viewbox' is defined as a region or volume of space in which an image formed by a display or other optical system (e.g., lens system) is visible and thus may be viewed. In other words, the viewbox defines a location or region in space within which a user's eyes may be placed in order to view an image produced by the display or display system. Moreover, the viewbox is generally large enough to accommodate both of a user's eyes. In some embodiments, the viewbox may represent a two dimensional region of space (e.g., a region with length and width but without substantial depth), while in other embodiments, the viewbox may include a three-dimensional region of space (e.g., a region with length, width and depth). Further, while referred to as a 'box', the viewbox may not be restricted to a box that is polygonal or rectangular in shape. For example, the viewbox may comprise a cylindrical region of space, in some embodiments. In other examples, the region of space may have various other shapes including, but not limited to, an elliptical cylinder, a hyperbolic cylinder and a general ellipsoid.

Further, as used herein, the article 'a' is intended to have its ordinary meaning in the patent arts, namely 'one or more'. For example, 'a directional scattering feature' means one or more directional scattering features and as such, 'the directional scattering feature' means 'the directional scattering feature(s)' herein. Also, any reference herein to 'top', 'bottom', 'upper', 'lower', 'up', 'down', 'front', 'back', 'first', 'second', 'left' or 'right' is not intended to be a limitation herein. Herein, the term 'about' when applied to a value generally means within the tolerance range of the equipment used to produce the value, or may mean plus or minus 10%, or plus or minus 5%, or plus or minus 1%, unless otherwise expressly specified. Further, the term 'substantially' as used herein means a majority, or almost all, or all, or an amount within a range of about 51% to about 100%. Moreover, examples herein are intended to be illustrative only and are presented for discussion purposes and not by way of limitation.

Figure 2A:
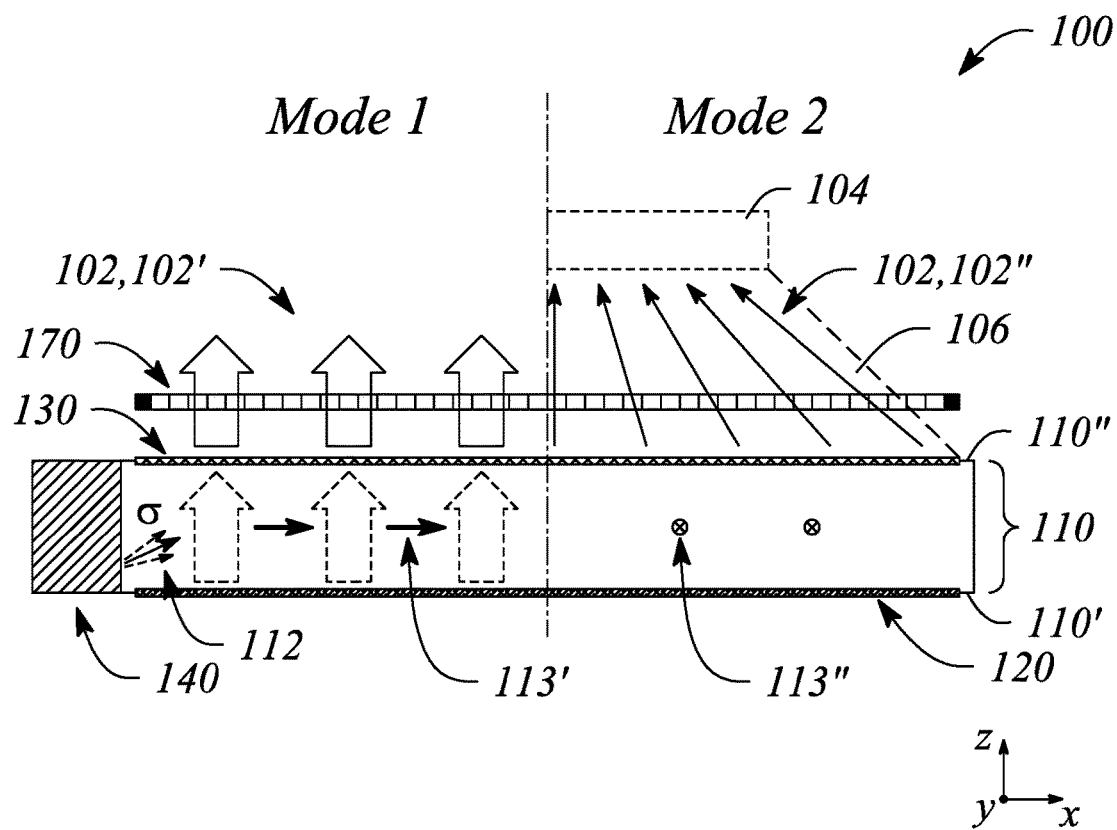
FIG. 2A illustrates a cross sectional view of a mode-selectable backlight in an example, according to an embodiment consistent with the principles described herein.
Figure 2B:
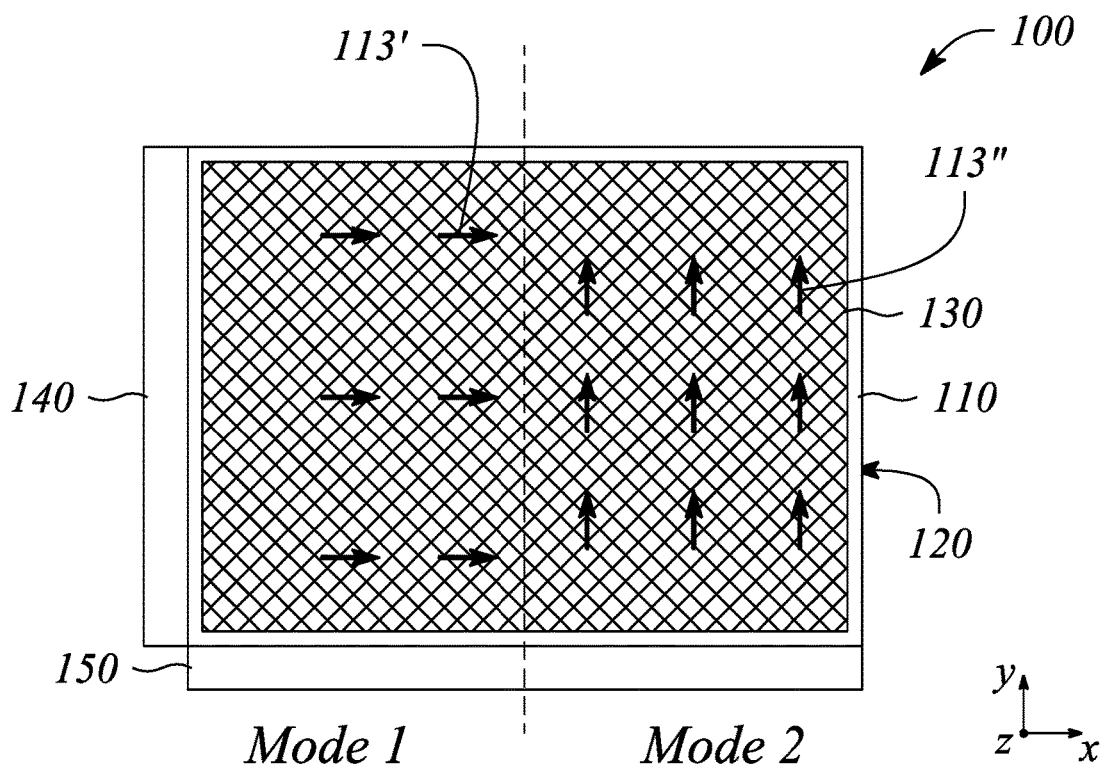
FIG. 2B illustrates a plan view of a mode-selectable backlight in an example, according to an embodiment consistent with the principles described herein.
Figure 2C:
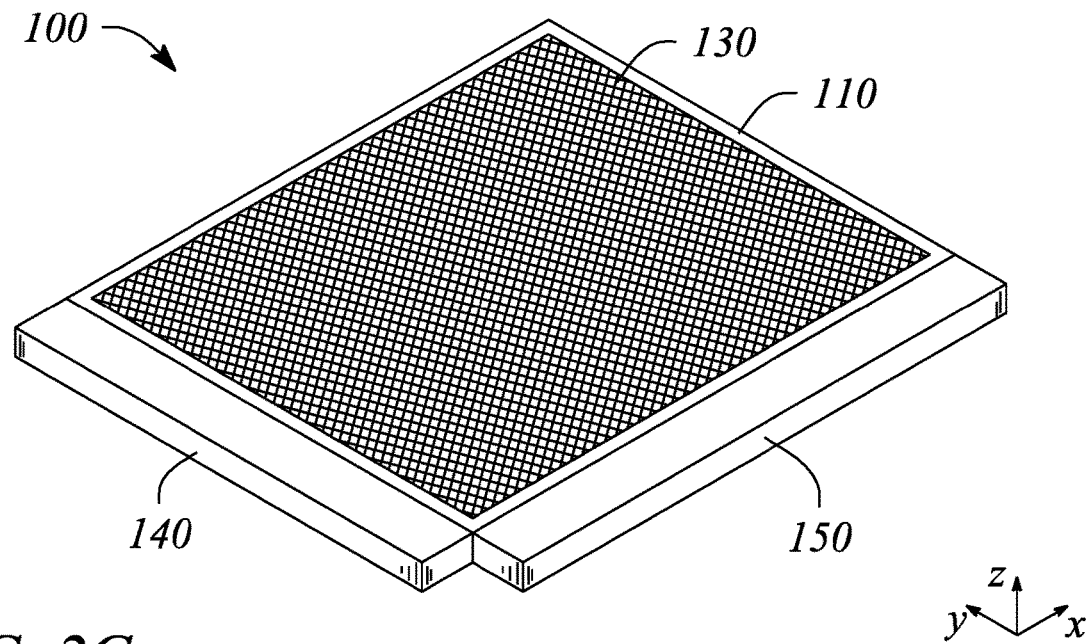
FIG. 2C illustrates a perspective view of a mode-selectable backlight in an example, according to an embodiment consistent with the principles described herein.

According to some embodiments of the principles described herein, a mode-selectable backlight is provided. FIG. 2A illustrates a cross sectional view of a mode-selectable backlight 100 in an example, according to an embodiment consistent with the principles described herein. FIG. 2B illustrates a plan view of a mode-selectable backlight 100 in an example, according to an embodiment consistent with the principles described herein. FIG. 2C illustrates a perspective view of a mode-selectable backlight 100 in an example, according to an embodiment consistent with the principles described herein. In FIGS. 2A and 2B, a first operational mode or 'public' mode (Mode 1) of the mode-selectable backlight 100 is depicted in a left half of the figure and a second operational mode or 'privacy' mode (Mode 2) is illustrated in a right half, i.e., respectively to a left and to a right of a dash-dot line in FIGS. 2A-2B.

The mode-selectable backlight 100 illustrated in FIGS. 2A-2C is configured to provide emitted light 102. The emitted light 102 is configured to have a direction that is generally away from a surface (e.g., an emission surface) of the mode-selectable backlight 100. In some embodiments, the emitted light 102 may be used in a variety of applications such as, but not limited to, to illuminate an array of light valves (e.g., light valves 170, described below) in a display application, for example.

In various operational modes of the mode-selectable backlight 100, the emitted light 102 may have or exhibit different characteristics. For example, as described below in more detail, in the public mode, the mode-selectable backlight 100 is configured to provide the emitted light 102 as broad-angle emitted light 102'. Alternatively, in the privacy mode, the mode-selectable backlight 100 is configured to provide the emitted light 102 as directional emitted light 102". According to various embodiments, the directional emitted light 102" is directed into a viewbox 104 adjacent to the mode-selectable backlight 100. Further, the directional emitted light 102" may be confined or at least substantially confined to a viewing cone 106 of the viewbox 104, as illustrated.

By definition, 'broad-angle' emitted light 102' is defined as light having a cone angle that is greater than a cone angle of the viewing cone 106 of the viewbox 104 of or associated with the mode-selectable backlight 100, described below. In particular, in some embodiments, the broad-angle emitted light 102' may have a cone angle that is greater than about ten degrees (e.g., >±10°). In other embodiments, the broad-angle emitted light 102' cone angle may be greater than about twenty degrees (e.g., >±20°), or greater than about thirty degrees (e.g., >±30°), or greater than forty degrees (e.g., >±40°). For example, the cone angle of the broad-angle emitted light 102' may be about sixty degrees (e.g., >±60°).

In some embodiments, the broad-angle emitted light 102' cone angle may be about the same as a viewing angle of an LCD computer monitor, an LCD tablet, an LCD television, or a similar digital display device meant for broad-angle viewing (e.g., about ±40-65°). In other embodiments, broad-angle emitted light 102' provided by the mode-selectable backlight 100 may also be characterized or described as diffuse light, substantially diffuse light, non-directional light (i.e., lacking any specific or defined directionality), or as light having a single or substantially uniform direction. The broad-angle emitted light 102' is illustrated in FIG. 2A as a broad arrows for ease of illustration. However, the broad arrows representing the broad-angle emitted light 102' are not meant to imply any particular directionality of the emitted light 102, but instead merely represent the emission and transmission of light, e.g., from the mode-selectable backlight 100.

On the other hand, directional emitted light 102" may comprise a plurality of directional light beams having different principal angular directions (or simply 'different directions') from one another. In some embodiments, the different light beams of the directional emitted light 102" are preferentially directed into the viewbox 104, by definition herein. As such, the directional emitted light 102" may be concentrated or substantially concentrated in the viewbox 104 by the mode-selectable backlight 100, according to various embodiments. In particular, primary rays of the directional emitted light 102" may be directed or 'aimed' at a center or midpoint of the viewbox 104. In some embodiments, the directional emitted light 102" may be modulated (e.g., by light valves of a display system, as described below) to 'form' or provide an image. In these embodiments, the image may be provided within the viewbox 104 as a 'private image'.

The private image is configured to be preferentially or, in some instances, exclusively visible within viewbox 104 as well as within a viewing cone 106 of the viewbox 104 to provide viewing privacy, according to various embodiments. That is, the private image is viewable by a user within the viewbox 104 (and in some examples, within the viewing cone 106). As such, the user may view the image when the user's eyes are within the viewbox 104. According to various embodiments, the private image may not be viewable outside of the viewbox 104 or viewing cone 106, e.g., in region 106'. In some examples, 'by not viewable' from the region 106' means that the formed image may appear substantially black.

As illustrated in FIGS. 2A-2C, the mode-selectable backlight 100 comprises a light guide 110. The light guide 110 may be a plate light guide, according to some embodiments. The light guide 110 is configured to guide light along a length of the light guide 110 as guided light 112. For example, the light guide 110 may include a dielectric material configured as an optical waveguide. The dielectric material may have a first refractive index that is greater than a second refractive index of a medium surrounding the dielectric optical waveguide. The difference in refractive indices is configured to facilitate total internal reflection of the guided light 112 according to one or more guided modes of the light guide 110, for example.

In some embodiments, the light guide 110 may be a slab or plate optical waveguide comprising an extended, substantially planar sheet of optically transparent, dielectric material. The substantially planar sheet of dielectric material is configured to guide the guided light 112 using total internal reflection. According to various examples, the optically transparent material of the light guide 110 may include or be made up of any of a variety of dielectric materials including, but not limited to, one or more of various types of glass (e.g., silica glass, alkali-aluminosilicate glass, borosilicate glass, etc.) and substantially optically transparent plastics or polymers (e.g., poly(methyl methacrylate) or 'acrylic glass', polycarbonate, etc.). In some examples, the light guide 110 may further include a cladding layer (not illustrated) on at least a portion of a surface (e.g., one or both of the top surface and the bottom surface) of the light guide 110. The cladding layer may be used to further facilitate total internal reflection, according to some examples.

Further, according to some embodiments, the light guide 110 is configured to guide the guided light 112 according to total internal reflection at a non-zero propagation angle between guiding surfaces of the light guide 110, e.g., between a first surface 110' (e.g., a 'back' surface or side) and a second surface 110" (e.g., a 'front' surface or side) of the light guide 110. In particular, the guided light 112 propagates by reflecting or 'bouncing' between the first surface 110' and the second surface 110" of the light guide 110 at the non-zero propagation angle. In some embodiments, the guided light 112 may comprise a plurality of guided light beams of different colors of light that are guided by the light guide 110 at respective ones of different color-specific, non-zero propagation angles. Note that the non-zero propagation angle is not illustrated for simplicity of illustration. However, a bold arrow in various figures depicting a propagation direction illustrates a general propagation direction of the guided light 112 along a length of the light guide 110.

As defined herein, a 'non-zero propagation angle' is an angle relative to a surface (e.g., the first surface 110' or the second surface 110") of the light guide 110. Further, the non-zero propagation angle is both greater than zero and less than a critical angle of total internal reflection within the light guide 110, according to various embodiments. Moreover, a specific non-zero propagation angle may be chosen (e.g., arbitrarily) for a particular implementation as long as the specific non-zero propagation angle is less than the critical angle of total internal reflection within the light guide 110. In various embodiments, the guided light 112 may be introduced or coupled into the light guide 110 at the non-zero propagation angle.

According to various embodiments, the guided light 112 or equivalently the guided 'light beam' produced by coupling light into the light guide 110 may be a collimated light beam. Herein, a 'collimated light' or 'collimated light beam' is generally defined as a beam of light in which rays of the light beam are substantially parallel to one another within the light beam (e.g., the guided light 112). Further, rays of light that diverge or are scattered from the collimated light beam are not considered to be part of the collimated light beam, by definition herein. In some embodiments, the mode-selectable backlight 100 may include a collimator such as, but not limited to, a lens, a reflector or mirror, or diffraction grating configured to collimate the light introduced into the light guide 110. In some embodiments, a source of light (e.g., a light source) may comprise a collimator. The guided light 112 may be collimated according to or having a collimation factor $\sigma$, in various embodiments.

According to various embodiments, the mode-selectable backlight 100 further comprises a first directional scattering feature 120. The first directional scattering feature 120 is configured to provide broad-angle emitted light 102' from guided light 112 having a first propagation direction within the light guide 110. In particular, the first directional scattering feature 120 is configured to preferentially or selectively scatter out the guided light 112 having the first propagation direction as opposed to guided light 112 having other propagation directions.

For example, the first propagation direction may be in an x-direction (i.e., aligned with or along an x-axis) illustrated in FIGS. 2A-2C, by way of example and not limitation. A bold arrow 113' in the left half of FIGS. 2A and 2B may represent the first propagation direction of the guided light 112, e.g., during or in the public mode (Mode 1). Thus, as illustrated in FIGS. 2A-2C, the first directional scattering feature 120 is configured to selectively scatter out guided light 112 propagating in the x-direction (as illustrated by the bold arrow 113') within the light guide 110 and not other directions (e.g., a y-direction).

According to various embodiments, the guided light 112 having the first propagation direction may be present during the public mode of the mode-selectable backlight 100. In particular, the guided light 112 having the first propagation direction may be present exclusively during the public mode, in some embodiments. As such, selection of the public mode may be provided by the presence of the guided light 112 having the first propagation direction. For example, turning on a light source that provides the guided light 112 having the first propagation direction may select the public mode. FIG. 2A employs broad arrows to depict either of the diffuse scattering pattern or the substantially unidirectional light of the broad-angle emitted light 102', e.g., to distinguish from directional light emitted light 102" of the privacy mode.

According to various embodiments, the first directional scattering feature 120 may comprise any of a variety of different scattering, structures, elements or scatterers configured to provide directional scattering including, but not limited to, a diffraction grating, a refractive scattering structure (e.g., various prismatic structures), a reflective scattering structure (e.g., faceted reflectors), a plasmonic or fluorescent scattering structure (e.g., anisotropic plasmonic or fluorescent resonators), and various combinations thereof. In some embodiments, the first directional scattering feature 120 may comprise a plurality of scattering elements spaced apart from one another along and across the light guide. The plurality of scattering elements may be configured to scatter out a portion of the guided light 112 having the first propagation direction to provide the broad-angle emitted light 102' during the public mode.

For example, the first directional scattering feature 120 may comprise a diffraction grating on a surface of the light guide 110, the diffraction grating comprising substantially parallel grooves or ridges. The substantially parallel grooves or ridges may be oriented perpendicular or substantially perpendicular (e.g., including a curvature) to the first propagation direction of the guided light 112. When the guided light 112 encounters the diffraction grating of the first directional scattering feature 120, a portion thereof may be selectively scattered out as the broad-angle emitted light 102'. The selective scattering is a result of the substantially perpendicular orientation or equivalently the substantially perpendicular angle of incidence of the guided light 112 with respect to the diffraction grating orientation.

Further, since a diffraction grating (e.g., of the first directional scattering feature 120) may function as an angle-preserving scattering structure, when the guided light 112 having the first propagation direction has a relatively large collimation factor $\sigma$ (i.e., a wide angular spread), broad-angle emitted light 102' having a corresponding wide beam spread may be provided. Thus, the broad-angle emitted light 102' provided by the first directional scattering feature 120 may be diffuse or substantially diffuse. Conversely, a relatively smaller collimation factor $\sigma$ may be used to provide broad-angle emitted light 102' that has a more confined angular spread. For example, the broad-angle emitted light 102' may comprise substantially parallel light beams that are emitted in a direction perpendicular to the light guide surface. In another example, broad-angle emitted light 102' that is spread over a broad angular range may be provided by a first directional scattering feature 120 comprising a diffraction grating having a random or substantially random grating spacing as function of distance across the light guide 110. The randomized grating spacing may be employed with or without guided light 112 having a large collimation factor σ, for example.

In other examples, refractive or reflective scattering structures having facets aligned to provide directional scattering configured to selectively scatter the guided light 112 having a the first propagation direction may be used as the first directional scattering feature 120. As with the diffraction grating example above, a relatively large collimation factor σ of the guided light 112 having the first propagation direction may be employed to produce broad-angle emitted light 102' that is diffuse, while a relatively smaller collimation factor σ may yield broad-angle emitted light 102' that is substantially unidirectional or that has a predetermined direction, for example. Broad-angle emitted light that is diffuse may also be provided using refractive or reflective scattering structures having facets with randomized slopes as the first directional scattering feature 120, for example. Various specific examples of scattering elements as well as a plurality of scattering elements suitable for use in or as the first directional scattering feature 120 may be found with reference to International Patent Application No. PCT/US2017/058854 to David A. Fattal, filed Oct. 27, 2017, incorporated herein by reference in its entirety.

As illustrated in FIGS. 2A-2C, the mode-selectable backlight 100 further comprises a second directional scattering feature 130. The second directional scattering feature 130 is configured to provide directional emitted light 102" from guided light 112 having a second propagation direction within the light guide 110. In particular, the directional emitted light 102" is provided by scattering or coupling out of the light guide 110 a portion of the guided light 112 having the second propagation direction. As illustrated in FIGS. 2A-2C, the second propagation direction may be in the y-direction (i.e., aligned with or along any-axis), by way of example and not limitation. An arrow 113" pointing into a plane of FIG. 2A and a bold arrow 113" in FIG. 2B, both in right half of the respective figures, illustrate the second propagation direction of the guided light 112. Thus, as illustrated in FIGS. 2A-2C, the second directional scattering feature 130 may be configured to selectively scatter out guided light 112 propagating in the y-direction as illustrated by the bold arrow 113" and not other directions (e.g., the x-direction illustrated by the bold arrow 113'). Further, the second directional scattering feature 130 is configured to not scatter or at least substantially not scatter the guided light 112 having the first propagation direction. As such, the second directional scattering feature 130 does not produce scattered light (i.e., directional emitted light 102") during the public mode, as illustrated in the right half of FIG. 2A.

As discussed above, the directional emitted light 102" may comprise a plurality of directional light beams having different principal angular directions from one another. Further, the directional emitted light 102" is directed toward and into the viewbox 104. In right side of FIG. 2A (Mode 2), the plurality of directional light beams of the directional emitted light 102" are depicted as separate arrows pointing in different directions to explicitly represent the different principal angular directions of the directional light beams. The separate arrows also point into the viewbox 104, as illustrated.

According to various embodiments, the second directional scattering feature 130 may comprise any of a variety of different scattering structures that provide directional scattering and that may be configured to provide directional emitted light 102" that is directed toward and into the viewbox 104. In particular, a scattering structure of the second directional scattering feature 130 may include, but is not limited to, a diffraction grating at a surface of the light guide 110. The diffraction grating of the second directional scattering feature 130 is configured to diffractively scatter out a portion of the guided light having the second propagation direction to provide the directional emitted light 102" during the privacy mode.

In some embodiments, the viewbox 104 may be a two-dimensional viewbox located in a plane parallel to the surface of the light guide 110. In these embodiments, the diffraction grating may comprise a plurality of curved diffractive features configured to direct the diffractively scattered out light in two orthogonal directions to provide the directional emitted light 102" to the two-dimensional viewbox 104. In some embodiments, the diffraction grating of the second directional scattering feature 130 comprises diffractive features having a feature spacing between adjacent diffractive features that decreases as a function of distance from a light-entrance edge of the light guide 110. In some embodiments (not illustrated), the diffraction grating of the second directional scattering feature 130 may comprise a plurality of sub-gratings, the sub-gratings of the plurality being spaced apart on the surface of the light guide 110 and configured to cooperatively concentrate the provided directional emitted light 102" into the viewbox 104. In some embodiments (not illustrated), the curved diffractive features may be approximated by a piece-wise linear diffractive features or by the plurality of sub-gratings arranged to approximate a curve of the diffractive features.

Figure 3A:
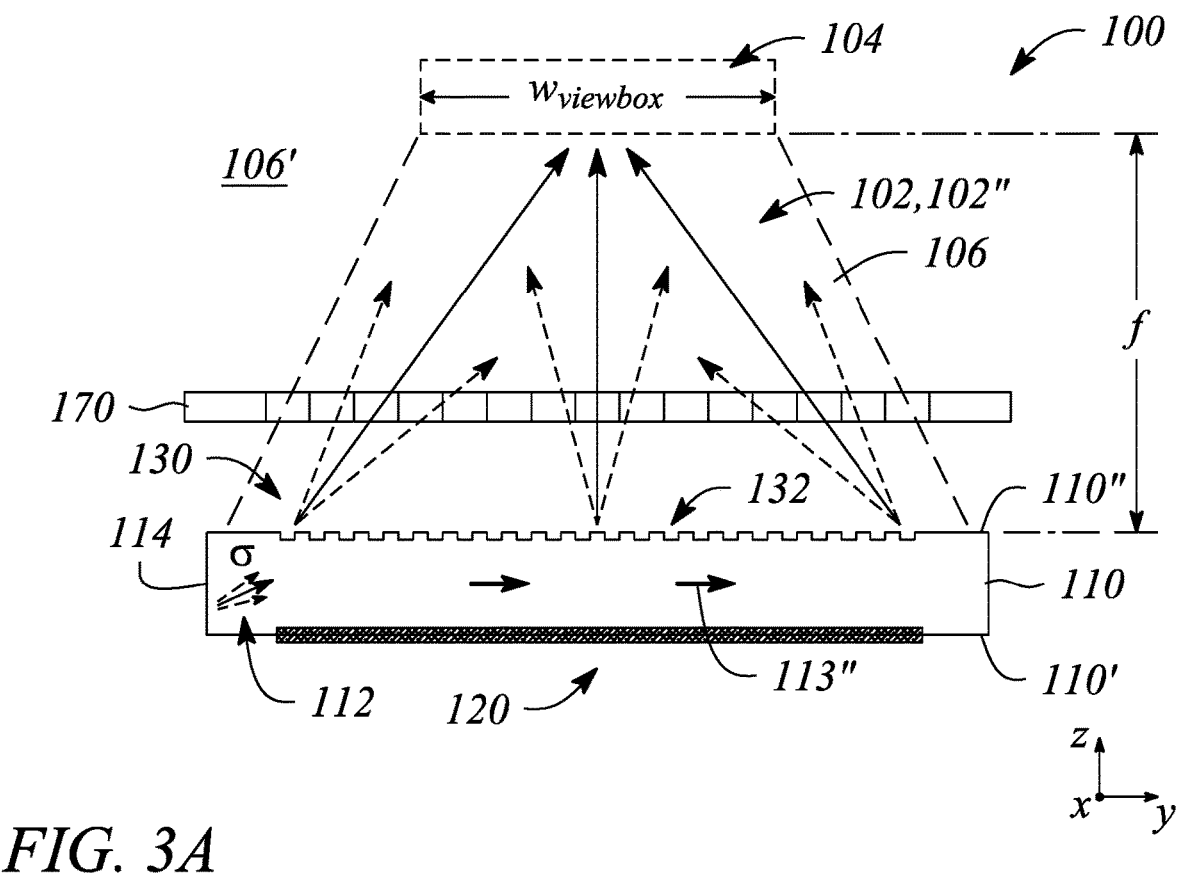
FIG. 3A illustrates a side view of a mode-selectable backlight in an example, according to an embodiment consistent with the principles described herein.
Figure 3B:
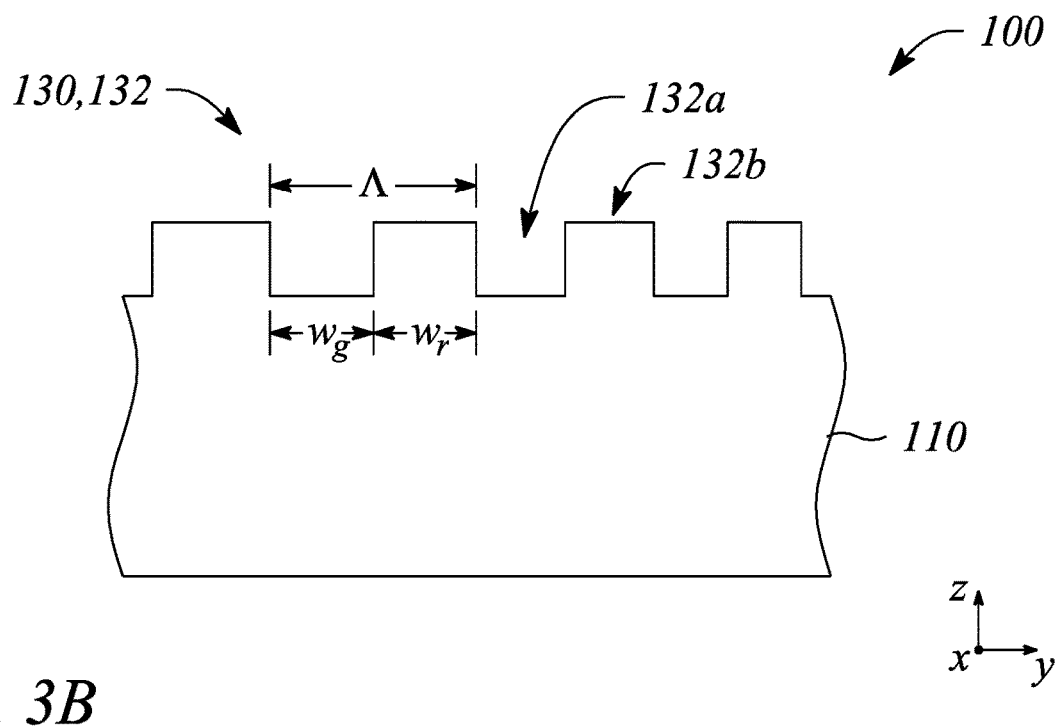
FIG. 3B illustrates a cross-sectional view of a portion of the mode-selectable backlight in FIG. 3A in an example, according to an embodiment consistent with the principles described herein.
Figure 3C:
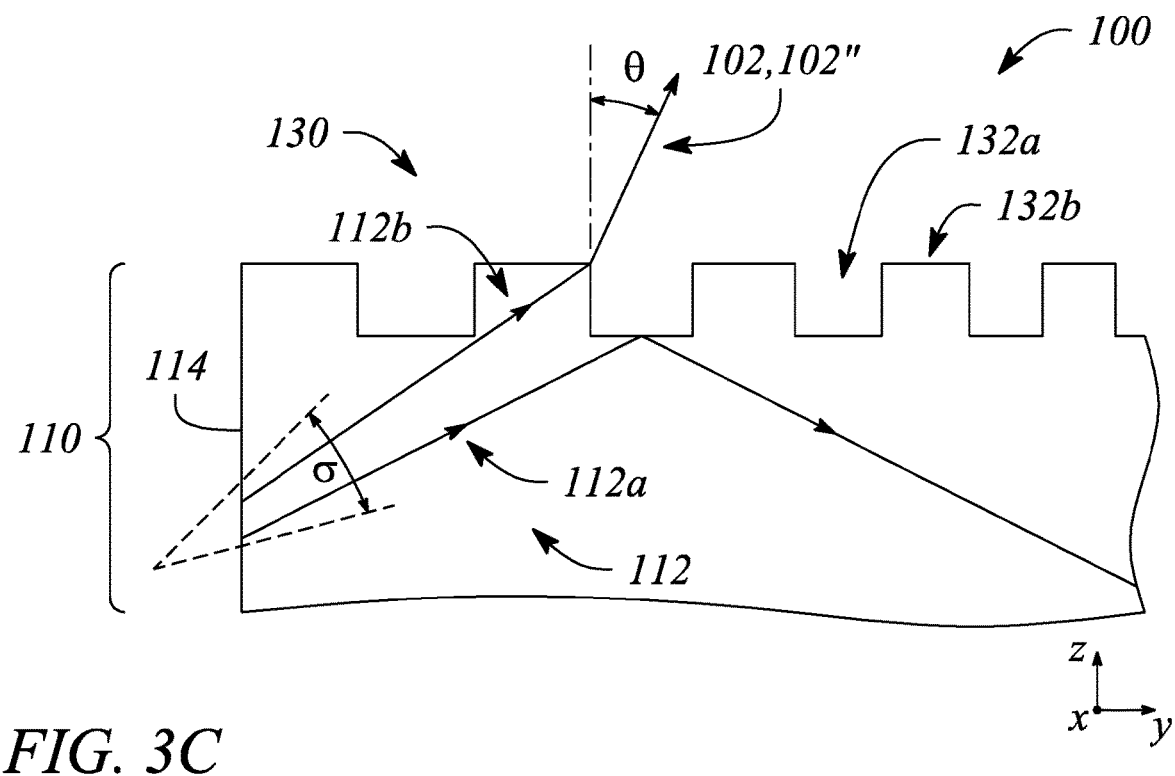
FIG. 3C illustrates a cross-sectional view of another portion of the mode-selectable backlight in FIG. 3A in an example, according to an embodiment consistent with the principles described herein.

FIG. 3A illustrates a side view of a mode-selectable backlight 100 in an example, according to an embodiment consistent with the principles described herein. FIG. 3B illustrates a cross-sectional view of a portion of the mode-selectable backlight 100 in FIG. 3A in an example, according to an embodiment consistent with the principles described herein. FIG. 3C illustrates a cross-sectional view of another portion of the mode-selectable backlight 100 in FIG. 3A in an example, according to an embodiment consistent with the principles described herein. In particular, FIGS. 3A-3C illustrate the mode-selectable backlight 100 operating in the privacy mode. As illustrated, the mode-selectable backlight 100 comprises the light guide 110, the first directional scattering feature 120 adjacent to the first surface 110' of the light guide 110 and the second directional scattering feature 130 adjacent to the second surface 110" of the light guide 110, the second surface 110" being depicted opposite to the first surface 110' in FIG. 3A. In FIGS. 3A-3C, the second directional scattering feature 130 comprises a diffraction grating 132. Also illustrated are the viewbox 104, a view cone 106, the directional emitted light 102", and the guided light 112 having the second propagation direction along with a propagation factor σ. In FIG. 3A, bold arrows 113" within the light guide 110 pointing away from the light-entrance edge 114 illustrate the second propagation direction of the guided light 112, for example, along the light guide length.

In an example, the collimation factor σ may represent an angular spread equal to or less than about plus or minus forty degrees (i.e., σ≤±40°). In other examples, the collimation factor σ may represent an angular spread equal to or less than about thirty degrees (i.e., σ≤±30°), equal to or less than about twenty degrees (i.e., σ≤±20°), or equal to or less than about 10 degrees (i.e., σ≤±10°). In yet other examples, the collimation factor σ may represent an angular spread that is equal to or less than about five degrees (i.e., σ≤±5°). As described below with respect to equation (1), a size of the viewbox 104 may be a function of the collimation factor σ. Further, in addition to having the predetermined collimation factor σ, a non-zero propagation angle of the guided light 112 is generally less than a critical angle of the light guide 110 with respect to total internal reflection.

According to various embodiments, the diffraction grating 132 of the second directional scattering feature 130 is configured to diffractively couple out a portion of the guided light 112 from within the light guide 110. In particular, the portion of guided light 112 may be diffractively coupled out as the directional emitted light 102". Further, the diffraction grating 132 is configured to direct the directional emitted light 102" into the viewbox 104 located adjacent to and spaced apart from the light guide surface (e.g., above the top surface, as illustrated). For example, FIG. 3A illustrates the directional emitted light 102" as arrows representing rays or beams of light (e.g., 'primary rays' or 'principal light beams') extending from the light guide surface to the viewbox 104. Moreover, the directional emitted light 102" may be substantially confined to the viewing cone 106 (e.g., a generally conical or pyramidal region or a 'light-transmission' cone) in a region of space between the light guide 110 and the viewbox 104 by the directing effects of the diffraction grating 132. The solid arrows representing principal light beams of the directional emitted light 102" are depicted as being directed or aimed at a center, midpoint or middle of the viewbox 104 in FIG. 3A. In other embodiments (not illustrated), the diffraction grating 132 may be configured to direct the light beams of the diffractively scatter out light to other portions of the viewbox 104, e.g., the light beams or primary rays may be distributed substantially throughout the viewbox 104.

A portion of the mode-selectable backlight 100 illustrated in the cross-sectional view of FIG. 3B depicts diffractive features of the diffraction grating 132 as ridges 132b that protrude in a z-direction from the light guide surface. Further, the ridges 132b are separated from one another by grooves 132a, as illustrated. A combination of a groove 132a and an adjacent ridge 132b represents a 'diffractive feature,' as illustrated in FIG. 3B. In other instances, the ridges 132b and the grooves 132a individually may be referred to as diffractive features.

Figure 4A:
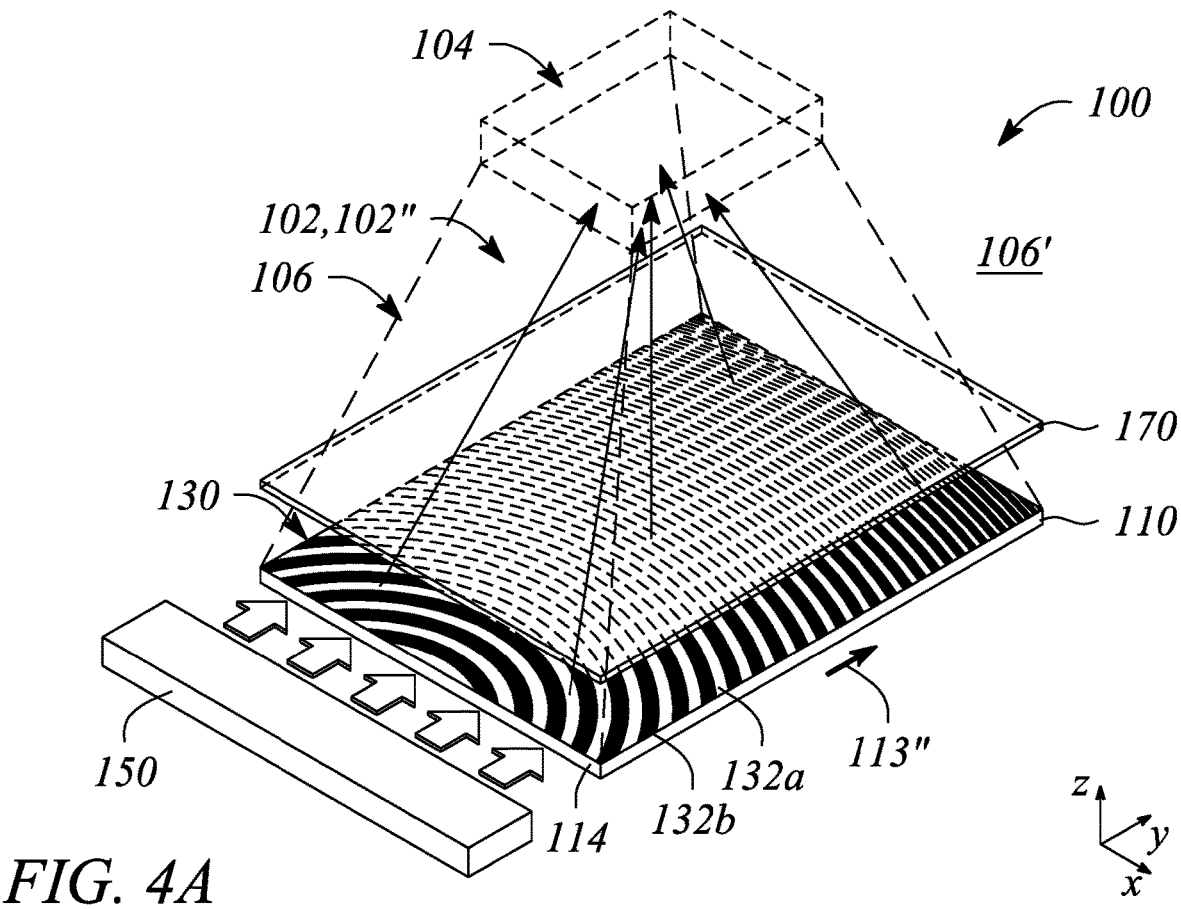
FIG. 4A illustrates a perspective view of the mode-selectable backlight in an example, according to an embodiment consistent with the principles described herein.
Figure 4B:
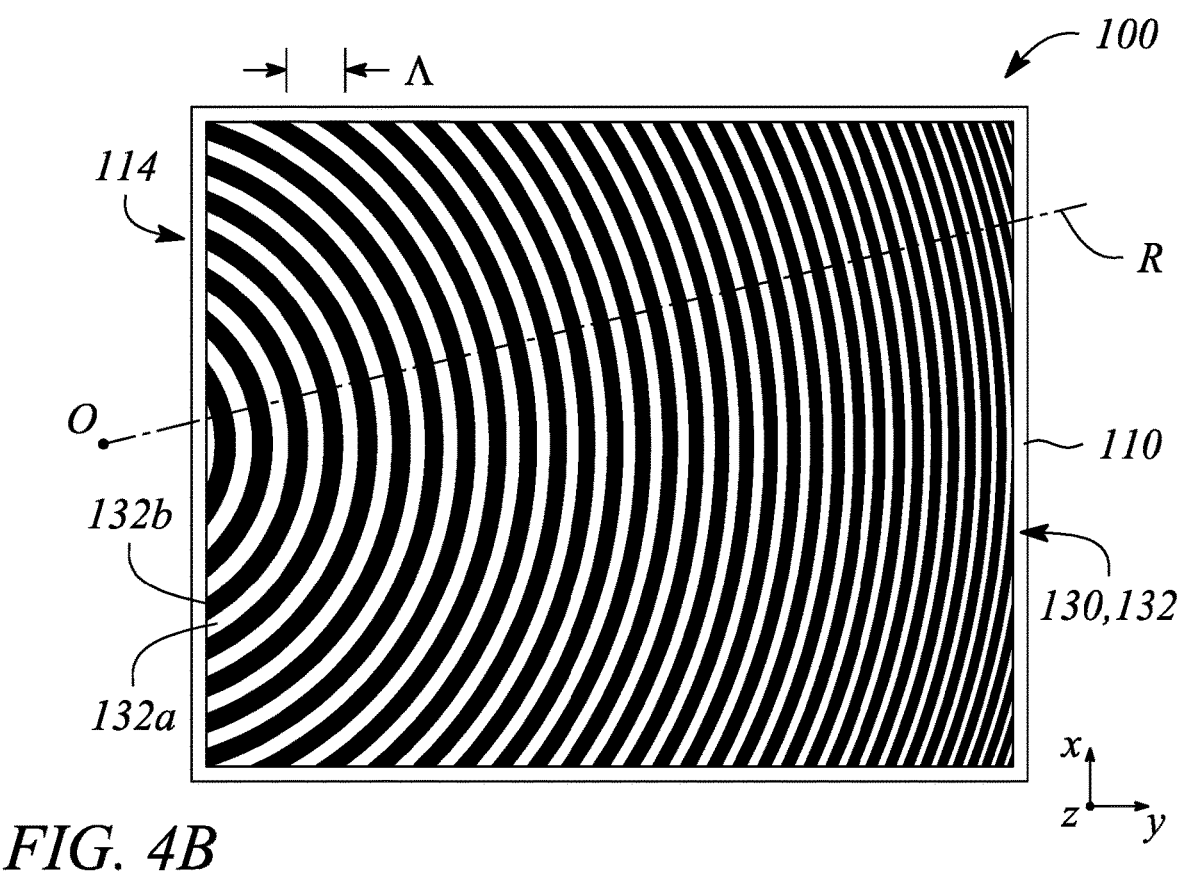
FIG. 4B illustrates a plan view of a portion of the mode-selectable backlight of FIG. 4A in an example, according to an embodiment consistent with the principles described herein.

As illustrated in FIG. 3B, a width of a groove 132a is denoted by $w_g$ and a width of a ridge 132b is denoted by $w_r$. A sum of the groove width $w_g$ and the ridge width $w_r$ is defined as a 'feature spacing' herein and is denoted by $\Lambda$ (i.e., $\Lambda=w_g+w_r$). An alternate definition of feature spacing (e.g., when the ridges 132b or the grooves 132a are individually referred to as the diffractive features) may be a center-to-center distance between an adjacent pair of the ridges 132b (separated by a groove 132a) or an adjacent pair of the grooves 132a (separated by a ridge 132b), for example. According to some embodiments (e.g., as illustrated in FIGS. 4A-4B, described below), the widths of the grooves 132a and the ridges 132b may be substantially constant along of a length of the diffractive features (e.g., the length of the grooves 132a and the ridges 132b). Further, in some embodiments, the feature spacing $\Lambda$ along the length of the diffractive features may be substantially constant. Moreover, the feature spacing $\Lambda$ may vary along a length of the light guide 110. For example, the feature spacing $\Lambda$ is illustrated as decreasing along a length of the from left to right in FIGS. 3B-3C, and in particular, the feature spacing $\Lambda$ decreases from the light-entrance edge 114 of the light guide 110 to an end of the light guide 110 that is opposite to an end at the light-entrance edge 114, as illustrated.

FIG. 3C illustrates a cross-sectional view of a portion of the mode-selectable backlight 100, in particular, a portion of the light guide 110 near the light-entrance edge 114. As illustrated therein, light that is coupled into the light guide 110 along the light-entrance edge 114 propagates within the light guide 110 as the guided light 112 having the second propagation direction as indicated by various extended arrows. As illustrated, some of the guided light 112, 112a is configured to remain within the light guide 110 due to total internal reflection. Other portions of the guided light 112, 112b is scattered out by the diffraction grating 132 to become the directional emitted light 102", as further illustrated FIG. 3C. Additionally, the second propagation direction of the guided light 112 during the privacy mode is in a general direction of the decreasing feature spacing $\Lambda$ of the diffraction grating 132 as illustrated, as further described below.

According to various embodiments, the guided light 112b that interacts with the diffraction grating 132 may be diffractively scattered out of the light guide 110, e.g., as a first order diffraction beam. As illustrated, the directional emitted light 102" may represent first order, diffracted light that is diffractively coupled out of the light guide 110 at a diffraction angle θ with respect to a surface normal of the light guide 110. In various embodiments, a zero order diffraction product as well as higher order diffraction products associated with the diffraction grating 132 may be substantially suppressed.

In some embodiments, the diffraction grating 132 may comprise diffractive features that are substantially straight (e.g., straight along a length of the groove 132a or the ridge 132b). Substantially straight diffractive features (e.g., both straight grooves 132a and ridges 132b) may provide a viewbox 104 that is substantially one-dimensional. That is, the viewbox 104 may have a width (e.g., in the longitudinal direction of the light guide 110) and may further have another dimension (e.g., a length) that is in a direction that is orthogonal to the direction of the width. The other dimension or length may be either substantially unconstrained or constrained by a similar extent of the light guide 110, for example. In other embodiments, the diffraction grating 132 may comprise either curved diffractive features or diffractive features arranged to approximate a curve along a length of the diffractive feature. The curved diffractive features may provide a two-dimensional viewbox 104.

FIG. 4A illustrates a perspective view of the mode-selectable backlight 100 in an example, according to an embodiment consistent with the principles described herein. FIG. 4B illustrates a plan view of a portion of the mode-selectable backlight 100 of FIG. 4A in an example, according to an embodiment consistent with the principles described herein. In particular, as illustrated in FIGS. 4A-4B, the diffraction grating 132 is located at the surface of the light guide 110 of the mode-selectable backlight 100 and comprises curved diffractive features. As illustrated, a diffraction pattern of the diffraction grating 132 is depicted as alternating black and white bands representing the curved diffractive features of the diffraction grating 132, e.g., one or both of grooves 132a and ridges 132b in or at a surface of the light guide 110. Further, as illustrated in FIG. 4B, concentric black and white curved lines represent concentric curved diffractive features (e.g., both of concentric curved ridges and concentric curved grooves) on the light guide surface, by way of example and not limitation. The concentric curved diffractive features have a center of curvature O, which is located beyond an edge of the light guide 110. In some embodiments, the curved diffractive features of the diffraction grating 132 may be represented by semicircles (i.e., may be semicircular curved diffractive features). In other embodiments, a substantially non-circular curve may be employed to realize the curved diffractive features. For example, the curved diffractive features may have a hyperbolic-shaped curve. As such, the concentric curved diffractive features may be concentric hyperbolic-shaped curved diffractive features, in some embodiments. According to various embodiments, the curve of the diffractive features may be configured to direct and, in some examples, concentrate the directional emitted light 102" in two orthogonal directions in a plane of the viewbox 104. As such, the curved diffractive features may be configured to provide a two-dimensional viewbox 104 having a predetermined length and a predetermined width, for example. In various embodiments, the two-dimensional viewbox 104 may be located in a plane parallel to the light guide surface (e.g., see FIG. 4A).

According to various embodiments, a feature spacing of the diffractive features in the diffraction grating 132 may vary as a function of distance along the light guide length or in the propagation direction of light within the light guide 110. For example, as illustrated in the cross sectional view of FIG. 3C as well as in the plan view of FIG. 4B, the feature spacing $\Lambda$ of the diffraction grating 132 decreases with increasing distance from light-entrance edge 114 (or equivalently from the center of curvature O in FIG. 4B). The feature spacing $\Lambda$ is also illustrated to be decreasing as a function of distance from the light-entrance edge 114 of the light guide 110 in FIG. 4A. For curved diffractive features, the distance from the center of curvature or from the light-entrance edge 114 may be measured along a radius R, for example. The feature spacing $\Lambda$ decrease as a function of distance may be referred to as a 'chirp' and the diffraction grating 132 may be a referred to as a 'chirped' diffraction grating, for example. Moreover, the decrease in feature spacing $\Lambda$ may represent a linear function of distance, in some embodiments. In other embodiments, the feature spacing may decrease according to another (i.e., non-linear) function of distance including, but not limited to, an exponential function of distance and a hyperbolic function of distance.

Figure 5:
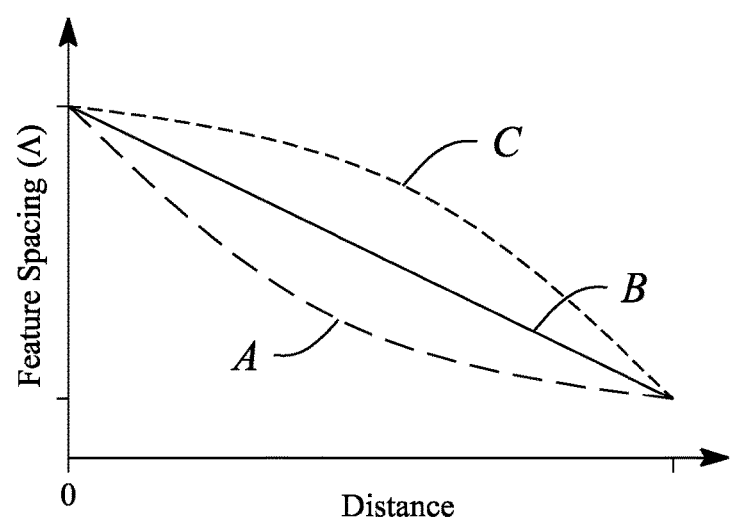
FIG. 5 illustrates a plot of diffractive feature spacing as a function of distance in an example, according to an embodiment consistent with the principles described herein.

FIG. 5 illustrates a plot of diffractive feature spacing as a function of distance in an example, according to an embodiment consistent with the principles described herein. As illustrated, a horizontal axis represents distance (e.g., a distance from the light-entrance edge 114 or a radial distance from the center of curvature O along a radius R). For example, a point labeled '0' on the horizontal axis may represent an intersection of the radius R and the light-entrance edge 114 of the light guide 110 in FIG. 4B. A vertical axis in the plot represents the feature spacing $\Lambda$ of the diffractive features of the diffraction grating 132. Curves A, B and C represent examples of different ways in which the feature spacing of the diffractive features may decrease with or as a function of increasing distance. In particular, the curve A represents an exponential decrease in feature spacing with increasing distance, e.g., from the center of curvature O. The curve B represents a linear decrease in feature spacing as a function of increasing distance, e.g., a linear chirp or linearly chirped diffraction grating. The curve C represents a hyperbolic decrease in feature spacing with increasing distance.

Referring again to FIG. 3A, as described above and as illustrated, the feature spacing of the diffraction grating 132 of the second directional scattering feature 130 is configured to diffractively scatter out and direct light into the viewbox 104 located a distance f from the mode-selectable backlight 100. For example, the distance f may be measured from the top surface of the light guide 110 and may represent an intended viewing distance, as illustrated in FIG. 3A. According to various embodiments, an approximate width $w_{viewbox}$ of the viewbox 104 may be given by a product of the distance f and the collimation factor $\sigma$ of the light propagating within the light guide 110 or, equivalently, the collimation factor $\sigma$ at which light enters the light guide 110 along the light-entrance edge 114. In particular, the viewbox width $w_{viewbox}$ may be given by equation (2) as:

$$w_{viewbox} = f \cdot \sigma \qquad (2)$$

In some embodiments, the viewbox width $w_{viewbox}$ in the longitudinal direction (e.g. light propagation direction) may be greater than about seventy millimeters (70 mm). A viewbox width $w_{viewbox}$ greater than about 70 mm may correspond to about an average interpupillary distance between eyes of a user viewing the mode-selectable backlight 100, for example. In particular, the viewbox width $w_{viewbox}$ may be large enough to accommodate both eyes of the user to facilitate viewing of an image provided by the mode-selectable backlight 100. However, the viewbox width $w_{viewbox}$ may also be small enough to substantially limit viewing by others outside of the viewbox 104, and effectively, substantially limit viewing by others located outside of the viewing cone 106, for example.

In particular, as is discussed above, the directional emitted light 102" provided by the mode-selectable backlight 100 may be substantially directed into the viewbox 104 or equivalently substantially confined within viewing cone 106 delineated by dashed lines in FIG. 3A. As such, light from, as well as an image provided by, the mode-selectable backlight 100 may preferentially or exclusively enter a user's eyes when the user's eyes are located within the viewbox 104. However, when another's eyes are located either outside the viewbox 104 or outside the viewing cone 106 (e.g., in a region 106'), the light from, as well as the image provided by, the mode-selectable backlight 100 will substantially not enter the other's eyes and thus be visible. As such, the mode-selectable backlight 100 and in particular the diffraction grating 132 may appear substantially black (i.e., unlit) when viewed from outside the viewbox 104 or from outside the viewing cone 106.

In some embodiments, a cone angle of the viewing cone 106 may be a negative cone angle. Herein a 'negative cone angle' is defined as a cone angle of emitted light that concentrates or directs light toward either a point in space or a relatively confined region of space. In other words, a negative cone angle produces a viewing cone 106 that include converging light. As such, the viewing cone 106 generally decreases in size as a function of distance from the mode-selectable backlight 100 with a negative cone angle, at least until the point in space is reached at which the light is directed. By way of example and not limitation, the viewing cones 106 in FIGS. 3A and 4A each have a negative cone angle, as illustrated. By contrast, a positive cone angle generally results in diverging emitted light, by definition herein. Additional discussion of the provision of a privacy display and of diffraction gratings of a privacy display that may be useful as the second directional scattering feature 130 may be found in International Patent Application No. PCT/US2016/043939 to David A. Fattal, filed Jul. 25, 2016, incorporated herein by reference in its entirety.

Referring again to FIGS. 2A-2C and according to various embodiments, mode-selection between the public mode and the privacy mode may be provided by controlling a presence or absence of the guided light 112 having either the first propagation direction or the second propagation direction, as mentioned above. In particular, the guided light 112 having the first propagation direction may be present during the public mode (Mode 1), while the guided light 112 having the second propagation direction may be present during the privacy mode (Mode 2) of the mode-selectable backlight 100. Moreover, in some embodiments, the guided light 112 having the first propagation direction may be present exclusively during the public mode. Thus, the first directional scattering feature 120 may provide the broad-angle emitted light 102' from the guided light 112 only during the public mode, in some embodiments. Similarly, in some embodiments, the guided light 112 having the second propagation direction may be present exclusively during the privacy mode. Thus, the second directional scattering feature 130 may provide the directional emitted light 102" from the guided light 112 only during the privacy mode, in some embodiments. In other embodiments, the guided light 112 having the second propagation direction may be present during both the public mode and the privacy mode. In these embodiments, both the first and second directional scattering features 120, 130 may provide emitted light 102 including a combination of broad-angle and directional emitted light 102', 102" during the public mode.

Further, according to various embodiments, the first and second directional scattering features 120, 130 may be located on or adjacent to either of the guiding surfaces of the light guide 110 (or even between the guiding surfaces). For example, FIG. 3A illustrates the first directional scattering feature 120 on the first surface 110' and the second directional scattering feature 130 on the second surface 110" of the light guide 110, by way of example and not limitation. As illustrated, the second directional scattering feature 130 is configured to scatter out a portion of the guided light 112 having the second propagation direction, the portion being scattered out through the second surface 110" to provide the directional emitted light 102" during the privacy mode. Further, the first directional scattering feature 120 is configured to scatter out a portion of the guided light 112 having the second propagation direction to provide the broad-angle emitted light 102', the scattered out portion also being scattered out through the second surface 110". As such, the second surface 110" of the light guide 110 may be referred to as an 'emission' surface. Further, the second directional scattering feature 130 may be configured to be transparent or at least substantially transparent to the broad-angle emitted light 102' produced by the first directional scattering feature 120, according to various embodiments. In other embodiments (not illustrated), the first directional scattering feature 120 may be on the second surface 110" of the light guide 110 and the second directional scattering feature 130 may be on the first surface 110'.

According to some embodiments, the mode-selectable backlight 100 may further comprise a plurality of light sources configured to provide the guided light 112 having the different propagation directions within the light guide 110. In particular, the mode-selectable backlight 100 illustrated in FIGS. 2A-2C further comprises a first light source 140 and a second light source 150. The first light source 140 may be configured to provide the guided light 112 having the first propagation direction within the light guide 110. Likewise, the second light source 150 may be configured to provide the guided light 112 having the second propagation direction within the light guide 110. In FIGS. 2A-2C, the first light source 140 is located on a first side of the light guide 110 and the second light source 150 is located on a second side of the light guide 110 orthogonal to the first side. Note that FIG. 4A illustrates only the second light source 150 for ease of illustration and not by way of limitation.

In various embodiments, the first and second light sources 140, 150 may comprise substantially any source of light (e.g., optical emitter) including, but not limited to, one or more light emitting diodes (LEDs) or a laser (e.g., laser diode). For example, the first and second light sources 140, 150 may each comprise a plurality or an array of LEDs distributed along a length of a corresponding side of the light guide 110. In some embodiments, one or both of the first and second light sources 140, 150 may comprise an optical emitter configured produce a substantially monochromatic light having a narrowband spectrum denoted by a particular color. In particular, the color of the monochromatic light may be a primary color of a particular color space or color model (e.g., a red-green-blue (RGB) color model). In other examples, one or both of the first and second light sources 140, 150 may comprise a substantially broadband light source configured to provide substantially broadband or polychromatic light. For example, the broadband or polychromatic light may be white light and the first and second light sources 140, 150 may be white light sources. In some embodiments, one or both of the first and second light sources 140, 150 may comprise a plurality of different optical emitters configured to provide different colors of light or in combination to provide white light.

In some embodiments, one or both of the first and second light sources 140, 150 may further comprise a collimator (not illustrated). The collimator may be configured to receive substantially uncollimated light from one or more of the optical emitters of the respective first and second light sources 140, 150 and to convert the substantially uncollimated light into collimated light. In particular, the collimator may provide collimated light one or both of having the non-zero propagation angle and being collimated according to a predetermined collimation factor σ. Moreover, when optical emitters of different colors are employed, the collimator may be configured to provide the collimated light having one or both of different, color-specific, non-zero propagation angles and having different color-specific collimation factors. The collimator is further configured to communicate collimated light to the light guide 110 to propagate as the guided light 112, described above.

In various examples, the collimator may comprise any of a variety of optical elements configured to collimate light including, but are not limited to, a lens, a reflector, and a diffraction grating. Another type of collimator that may be employed is a so-called tapered collimator comprising a section of tapered light guide. Collimators comprising various combinations of collimating structure may also be used, e.g., a collimator comprising a section of tapered light guide in combination with a collimating lens or reflector.

In some embodiments, the mode-selectable backlight 100 may be employed in conjunction with (e.g., to illuminate) an array of light valves. For example, the array of light valves may be part of a mode-selectable privacy display and the light valves may be used to modulate the emitted light 102 to form or display images. In particular, a public image may be displayed in the public mode by modulating the broad-angle emitted light 102' and a private image may be displayed in the privacy mode by modulating the directional emitted light 102" using the light valve array.

FIGS. 2A, 3A and 4A illustrate an array of light valves 170 that is both adjacent to the light guide 110 and located between the light guide 110 and the viewbox 104, by way of example and not limitation. Further, as illustrated, the array of light valves 170 may be oriented substantially parallel to the light guide 110 and located to intersect the viewing cone 106 to which the directional emitted light 102" is confined during the privacy mode. In particular, individual light valves 170 of the light valve array may be independently configured to provide pixels that together may form the public image in the public mode and separately may form the private image at the viewbox 104 during the privacy mode.

According to various embodiments, the provided private image is viewable by a user within the viewbox 104 (and in some examples, within the viewing cone 106). As such, the user may view the image when the user's eyes are within the viewbox 104. According to various embodiments, the private image may not be viewable outside of the viewbox 104 or viewing cone 106, e.g., in region 106'. In some examples, 'by not viewable' from the region 106' means that the private image may appear substantially black during the privacy mode. However, during the public mode (not illustrated in FIGS. 3A and 4A), the public image provided by modulating the broad-angle emitted light 102' may be viewable outside of the viewbox 104.

According to some embodiments, the array of light valves 170 may comprise substantially any of a variety of light valves including, but not limited to, liquid crystal light valves, electrowetting light valves, electrophoretic light valves or a combination of these. For example, the array of light valves 170 may comprise an array of liquid crystal light valves, each of which may be individually operated as a pixel by modulating an amount of light passing through a light valve. In some embodiments, the light valves 170 may be colored light valves (i.e., a light valve may include a color filter). For example, the light valve array may comprise a plurality of red light valves, a plurality of green light valves, and a plurality of blue light valves. Together the red, green and blue light valves of the array of light valves 170 may provide a red-green-blue (RGB) based 'full color' formed image (public or private) by modulating the emitted light 102, for example. In particular, the directional emitted light 102" passing through individual light valves 170 of the light valve array may be selectively modulated to create a full color private image or a black and white private image in the viewbox 104 and the viewing cone 106 during the privacy mode. Likewise, broad-angle emitted light 102' may be modulated to create a full color public image or a black and white public image that may be viewed over a broad viewing angle (i.e., the public image is not confined to the viewbox 104).

In accordance with some embodiments of the principles described herein, a mode-selectable privacy display is provided. The mode-selectable privacy display is configured to emit modulated light as pixels of the mode-selectable privacy display. In a public mode, the emitted modulated light may be diffuse or non-directional to display a public image. In particular, emitted modulated light emitted is broad-angle emitted light in the public mode. In a privacy mode, the emitted modulated light comprises a directional emitted light that is preferentially directed toward a viewbox of the mode-selectable privacy display to display a private image. According to various embodiments, the private image is configured to be visible within a viewbox or equivalently a viewing cone of the viewbox of the mode-selectable privacy display.

Figure 6:
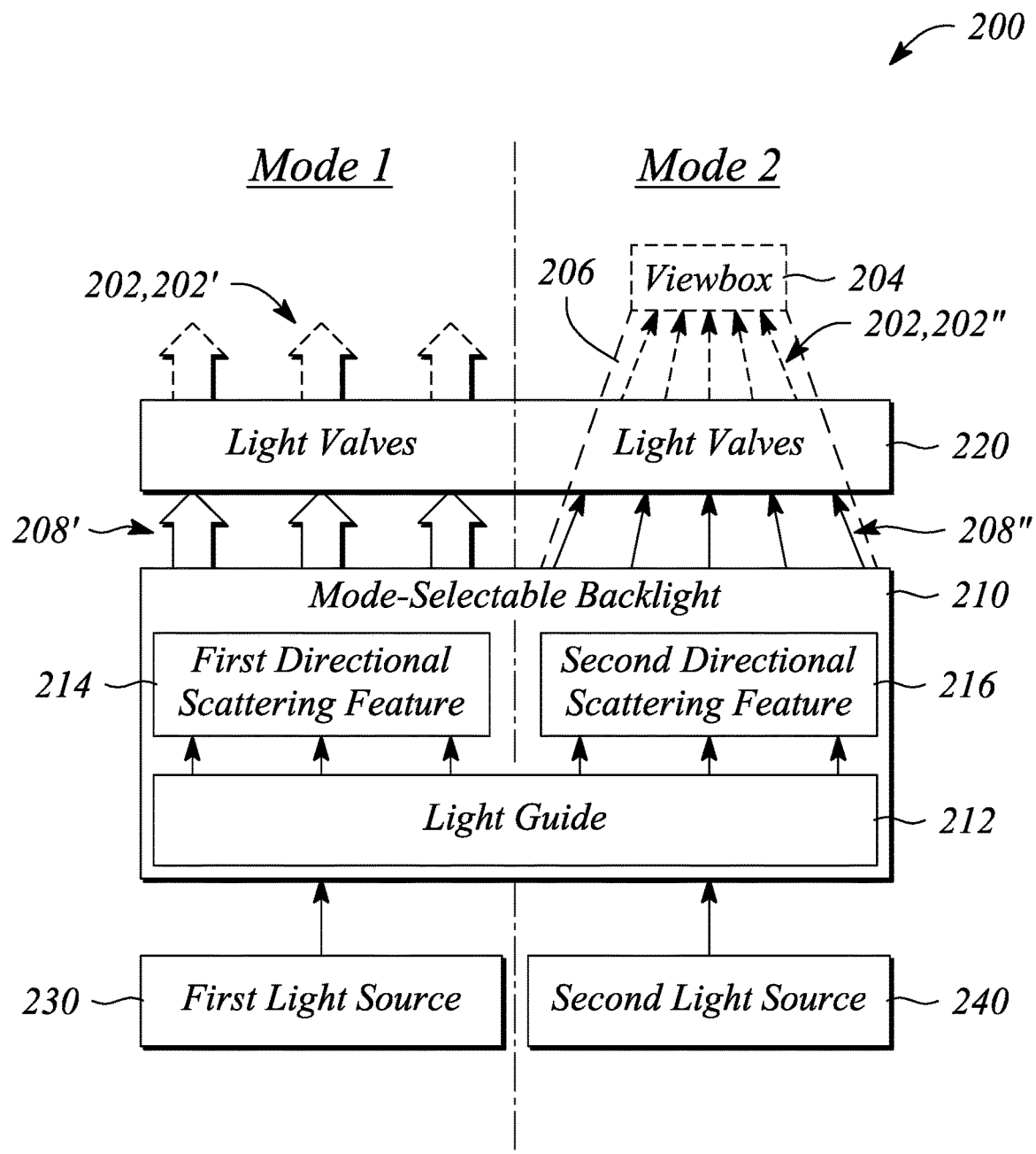
FIG. 6 illustrates a block diagram of a mode-selectable privacy display in an example, according to an embodiment consistent with the principles described herein.

FIG. 6 illustrates a block diagram of a mode-selectable privacy display 200 in an example, according to an embodiment consistent with the principles described herein. According to various embodiments, the mode-selectable privacy display 200 is configured to display a public image in a first operational mode or public mode and a private image in a second operational mode or privacy mode. In particular, in the public mode, modulated broad-angle emitted light 202' emitted by the mode-selectable privacy display 200 may represent or be used to display the private image. In the privacy mode, modulated directional emitted light 202" emitted by the mode-selectable privacy display 200 may represent or be used to display the private image. A left half of FIG. 6 illustrates the mode-selectable privacy display 200 operating in the public mode (Mode 1) to display the public image, while a right half of FIG. 6 illustrates the mode-selectable privacy display 200 operating in the privacy mode (Mode 2) to display the private image. Further, FIG. 6 illustrates a viewbox 204 and a viewing cone 206 of the viewbox 204 associated with the mode-selectable privacy display 200.

The mode-selectable privacy display 200 illustrated in FIG. 6 comprises a mode-selectable backlight 210. The mode-selectable backlight 210 comprises a light guide 212 is configured to guide light as guided light. The mode-selectable backlight 210 further comprises a first directional scattering feature 214 and a second directional scattering feature 216. The first directional scattering feature 214 is configured to scatter out guided light from within the light guide to provide broad-angle emitted light 208' during the public mode. The second directional scattering feature 216 is configured to scatter out guided light from within the light guide 212 to provide directional emitted light 208" during the privacy mode. Further, the directional emitted light 208" is configured to be directed toward the viewbox 204 and confined, or at least substantially confined, to the viewing cone 206 of the viewbox 204, according to various embodiments.

In some embodiments, the mode-selectable backlight 210 may be substantially similar to the mode-selectable backlight 100 described above. In particular, in some embodiments the light guide 212 may be substantially similar to the light guide 110, the first directional scattering feature 214 may be substantially similar to the first directional scattering feature 120, and the second directional scattering feature 216 may be substantially similar to the second directional scattering feature 130, of the above-described mode-selectable backlight 100. For example, the light guide 212 may be configured during the public mode to guide light as guided light having a first propagation direction and to guide light as guided light having a second propagation direction during the privacy mode. Likewise, the first directional scattering feature 214 may be configured to selectively scatter out the guided light having the first propagation direction and the second directional light scattering feature 216 may be configured to selectively scatter out the guided light having the second propagation direction, for example.

As illustrated in FIG. 6, the mode-selectable privacy display 200 further comprises an array of light valves 220. The array of light valves 220 is configured to modulate the broad-angle emitted light 208' to display the public image during the public mode (Mode 1) and to modulate the directional emitted light 208" to display the private image during the privacy mode (Mode 2). In particular, the array of light valves 220 is configured to modulate the broad-angle emitted light 208' and provide the modulated broad-angle emitted light 202' during the public mode. In turn, the modulated broad-angle emitted light 202' provides or represents the public image. Similarly, the array of light valves 220 is configured during the privacy mode to modulate the directional emitted light 208" and provide the modulated directional emitted light 202", the private image being provided or represented by the modulated directional emitted light 202''. Further, the private image provided or represented by the modulated directional emitted light 202'' is configured to be visible within the viewbox 204 or equivalently within a viewing cone 206 of the viewbox 204, according to various embodiments. In some embodiments, the array of light valves 220 may be substantially similar to the array of light valves 170 described above with respect to the mode-selectable backlight 100. For example, array of light valves 220 may comprise liquid crystal light valves.

According to some embodiments, he mode-selectable privacy display 200 may further comprise a plurality of light sources. In particular, as illustrated in FIG. 6, the mode-selectable privacy display 200 may comprise a first light source 230 and a second light source 240. The first light source 230 is configured to provide the guided light having the first propagation direction within the light guide 212 during the public mode (Mode 1). The second light source 240 is configured to provide the guided light having the second propagation direction within the light guide 212 during the privacy mode (Mode 2). In some embodiments, the first and second light sources 230, 240 of the mode-selectable privacy display 200 may be substantially similar respectively to the first and second light sources 140, 150 of the mode-selectable backlight 100, described above. For example, the first light source 230 may be connected to a first side of the light guide 212 and the second light source 240 may be connected to a second side of the light guide 212, the second side being orthogonal to the first side. As such, the first propagation direction of the guided light may be orthogonal or substantially orthogonal to the second propagation direction, in some embodiments.

In some embodiments, the first directional scattering feature 214 may comprise a plurality of scattering elements spaced apart from one another along and across the light guide 212. The plurality of scattering elements may be configured to scatter out a portion of the guided light having the first propagation direction within the light guide to provide the broad-angle emitted light 208' during the public mode. In some embodiments, a scattering element of the plurality of scattering elements may have a size that is less than a size of a light valve of the light valve array. In some embodiments, scattering element of the scattering element plurality may comprise a diffraction grating configured to diffractively scatter out the portion of the guided light having the first propagation direction during the public mode.

In some embodiments, the second directional scattering feature 216 comprises a diffraction grating at a surface of the light guide 212. The diffraction grating may be configured to diffractively scatter out a portion of the guided light having the second propagation direction to provide the directional emitted light 208'' during the privacy mode. In some embodiments, the diffraction grating of the second directional scattering feature 216 may comprise diffractive features having a feature spacing between adjacent diffractive features that decreases as a function of distance from a light-entrance edge of the light guide 212. The light entrance edge may be an edge adjacent to the second light source 240, for example. In some embodiments, the first directional scattering feature 214 may be located at a first surface of the light guide 212 and the second directional scattering feature 216 may be located at a second surface of the light guide 212. The second surface may be opposite the first surface, for example. Further, the first directional scattering feature 214 may be configured to scatter out guided light through the second surface to provide the broad-angle emitted light 208'. The second surface may be an emission surface of the light guide 212 as the directional emitted light 208'' may also be emitted from the second surface, according to various embodiments.

Figure 7:
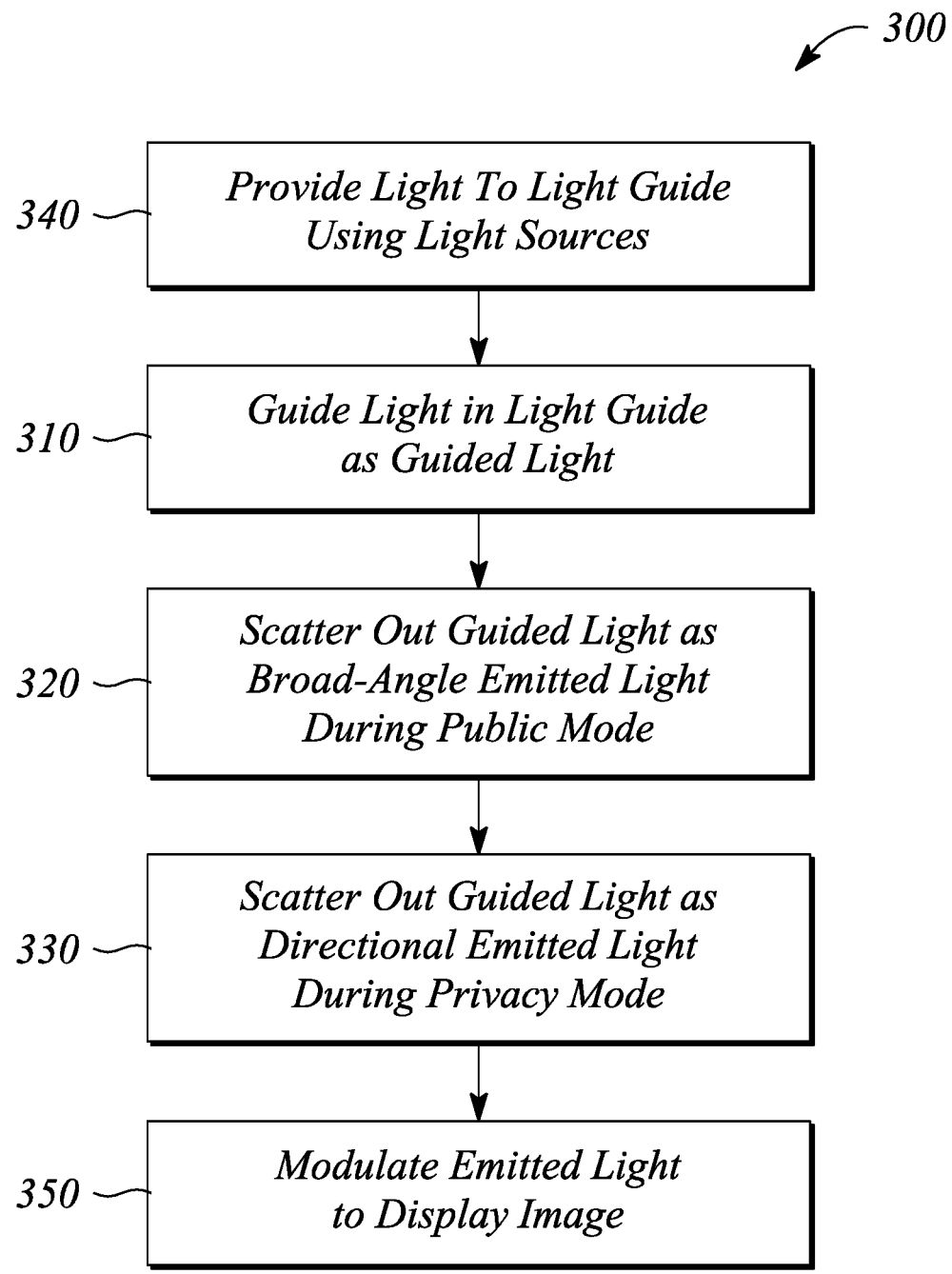
FIG. 7 illustrates a flow chart of a method of operating a mode-selectable backlight in an example, according to an embodiment consistent with the principles described herein.

In accordance with other embodiments of the principles described herein, a method of operating a mode-selectable backlight is provided. FIG. 7 illustrates a flow chart of a method 300 of operating a mode-selectable backlight in an example, according to an embodiment consistent with the principles described herein. As illustrated in FIG. 7, the method 300 of operating a mode-selectable backlight comprises guiding 310 light in a light guide as guided light. In some embodiments, the light may be guided 310 at a non-zero propagation angle. Further, the guided light may be collimated according to a predetermined collimation factor. Further still, the guided light may be polarized, in some embodiments. According to some embodiments, the light guide may be substantially similar to the light guide 110 described above with respect to the mode-selectable backlight 100. Similarly, the guided light may be substantially similar to the guided light 112, also described above.

As illustrated in FIG. 7, the method 300 of operating a mode-selectable backlight further comprises scattering out 320 guided light from the light guide as broad-angle emitted light during a public mode using a first directional scattering feature. According to various embodiments, the guided light has a first propagation direction during the public mode. Moreover, the first directional scattering feature is configured to selectively scatter out 320 the guided light having the first propagation direction, e.g., as opposed to another propagation direction. In some embodiments, the first directional scattering feature may be substantially similar to the first directional scattering feature 120 of the mode-selectable backlight 100, described above. For example, the first directional scattering feature may comprise any of a variety of different scattering structures or elements. In particular, the first directional scattering feature comprises a plurality of scattering elements such as, but not limited to diffraction gratings, spaced apart from one another along and across the light guide, the plurality of scattering elements being configured to scatter out a portion of the guided light having the first propagation direction to provide the broad-angle emitted light during the public mode.

The method 300 of operating a mode-selectable backlight illustrated in FIG. 7 further comprises scattering out 330 guided light from the light guide as directional emitted light during a privacy mode using a second directional scattering feature. During the privacy mode, the guided light has a second propagation direction. Moreover, the first and second propagation directions are different, according to various embodiments. For example, the first and second propagation directions may be orthogonal or substantially orthogonal to one another. Further, the directional emitted light scattered out 330 is preferentially directed into a viewbox adjacent to the mode-selectable backlight, according to various embodiments. In some embodiments, the directional emitted light may be confined to a viewing cone of the view box.

According to various embodiments, the second directional scattering feature is configured to selectively scatter out 330 the guided light having the second propagation direction, e.g., as opposed to another propagation direction such as the first propagation direction. Further, in some embodiments, the second directional scattering feature may be substantially similar to the second directional scattering feature 130 described above with respect to the mode-selectable backlight 100. For example, in some embodiments, the second directional scattering feature may comprise a diffraction grating at a surface of the light guide, the diffraction grating being configured to diffractively scatter out a portion of the guided light having a second propagation direction to provide the directional emitted light during the privacy mode. In some embodiments, the diffraction grating of the second directional scattering feature may comprise diffractive features having a feature spacing between adjacent diffractive features that decreases as a function of distance from a light-entrance edge of the light guide. In some embodiments, the diffraction grating of the second directional scattering feature may comprise a plurality of sub-gratings. In some embodiments, the diffraction grating of the second directional scattering feature may comprise a plurality of curved diffractive features configured to direct the diffractively scatter out light in two orthogonal directions to provide the directional emitted light to the two-dimensional viewbox.

In some embodiments (e.g., as illustrated), the method 300 of operating a mode-selectable backlight further comprises providing 340 light to the light guide using a plurality of light sources, the provided light to be guided 310 as the guided light. In various embodiments, the plurality of light sources may comprise a first light source configured to provide the guided light having the first propagation direction within the light guide. The first light source may be configured to provide the guided light during the public mode. The plurality of light sources further comprises a second light source configured to provide guided light having the second propagation direction within the light guide. In some embodiments, the first light source may be located on a first side of the light guide and the second light source may be located on a second side of the light guide orthogonal to the first side. The side locations of the first and second light sources being orthogonal to one another may facilitate providing the guided light such that the first propagation direction is orthogonal to the second propagation direction. According to some embodiments, the first and second light sources may be substantially similar respectively to the first and second light sources 140, 150 of the mode-selectable backlight 100, described above.

As illustrated in FIG. 7, the method 300 of operating a mode-selectable backlight may further comprise modulating 350 the light emitted by the mode-selectable backlight using an array of light valves. The emitted light may be modulated 350 to display an image, for example. In particular, during the public mode the array of light valves may modulate 350 the broad-angle emitted light to display the image as a public image and during the privacy mode the array of light valves may modulate 350 the directional emitted light to preferentially display the image within the viewbox as a private image. In some embodiments, the private image is only visible within the viewbox or within a view cone of the viewbox during the privacy mode, while the public image may be generally visible over a broad range of viewing angles. According to some embodiments, the array of light valves may be substantially similar to the array of light valves 170 described above with respect to the mode-selectable backlight 100.

Thus, there have been described examples and embodiments of a mode-selectable backlight, mode-selectable privacy display, and a method of operating a mode-selectable backlight that include a first directional scattering feature and a second directional scattering feature. It should be understood that the above-described examples are merely illustrative of some of the many specific examples that represent the principles described herein. Clearly, those skilled in the art can readily devise numerous other arrangements without departing from the scope as defined by the following claims.

What is claimed is:

1. A mode-selectable backlight comprising:
a light guide configured to guide light as guided light;
a first directional scattering feature configured to provide broad-angle emitted light from the guided light having a first propagation direction within the light guide during a public mode of the mode-selectable backlight; and
a second directional scattering feature configured to provide directional emitted light from the guided light having a second propagation direction within the light guide during a privacy mode of the mode-selectable backlight, the directional emitted light being directed into a viewbox adjacent to the mode-selectable backlight,
wherein the first propagation direction differs from the second propagation direction.

2. The mode-selectable backlight of claim 1, wherein the first directional scattering feature comprises a plurality of scattering elements spaced apart from one another along and across the light guide, the plurality of scattering elements being configured to scatter out a portion of the guided light having the first propagation direction to provide the broad-angle emitted light during the public mode.

3. The mode-selectable backlight of claim 2, wherein a scattering element of the scattering element plurality comprises a diffraction grating configured to diffractively scatter out the portion of the guided light having the first propagation direction during the public mode.

4. The mode-selectable backlight of claim 1, wherein the second directional scattering feature comprises a diffraction grating at a surface of the light guide, the diffraction grating being configured to diffractively scatter out a portion of the guided light having the second propagation direction to provide the directional emitted light during the privacy mode.

5. The mode-selectable backlight of claim 4, wherein the viewbox is a two-dimensional viewbox located in a plane parallel to the surface of the light guide, and wherein the diffraction grating comprises a plurality of curved diffractive features configured to direct the diffractively scatter out light in two orthogonal directions to provide the directional emitted light to the two-dimensional viewbox.

6. The mode-selectable backlight of claim 4, wherein the diffraction grating comprises diffractive features having a feature spacing between adjacent diffractive features that decreases as a function of distance from a light-entrance edge of the light guide.

7. The mode-selectable backlight of claim 4, wherein the diffraction grating comprises a plurality of sub-gratings, the sub-gratings of the plurality being spaced apart on the surface of the light guide and configured to cooperatively concentrate the provided directional emitted light into the viewbox.

8. The mode-selectable backlight of claim 1, wherein the first directional scattering feature is located at a first surface of the light guide and the second directional scattering feature is located at a second surface of the light guide opposite the first surface, the second directional scattering feature being configured to scatter out a portion of the guided light having the second propagation direction through the first surface to provide the directional emitted light.

9. The mode-selectable backlight of claim 1, further comprising:
a first light source configured to provide the guided light having the first propagation direction within the light guide; and
a second light source configured to provide guided light having the second propagation direction within the light guide,
wherein the first light source is located on a first side of the light guide and the second light source is located on a second side of the light guide orthogonal to the first side.

10. A mode-selectable privacy display comprising the mode-selectable backlight of claim 1, the mode-selectable privacy display further comprising an array of light valves configured to modulate light emitted by the mode-selectable backlight, wherein during the public mode the array of light valves is configured to modulate the broad-angle emitted light as a public image and during the privacy mode the array of light valves is configured to modulate the directional emitted light as a private image, the private image being configured to be exclusively visible within a viewing cone of the viewbox to provide viewing privacy.

11. A mode-selectable privacy display comprising:
a mode-selectable backlight comprising:
a light guide configured to guide light;
a first directional scattering feature configured to scatter out guided light of a first propagation direction from within the light guide to provide broad-angle emitted light during a public mode; and
a second directional scattering feature configured to scatter out guided light of a second propagation direction from within the light guide to provide directional emitted light during a privacy mode; and
an array of light valves configured to modulate the broad-angle emitted light to display a public image during the public mode and to modulate the directional emitted light to display a private image during the privacy mode,
wherein the private image is configured to be visible within a viewbox of the mode-selectable privacy display, wherein the first and second propagation directions are different from one another.

12. The mode-selectable privacy display of claim 11, further comprising:
a first light source configured to provide light as guided light having a first propagation direction within the light guide during the public mode; and
a second light source configured to provide light as guided light having a second propagation direction within the light guide during the privacy mode,
wherein the first directional scattering feature is configured to selectively scatter out the guided light having the first propagation direction and the second directional scattering feature is configured to selectively scatter out the guided light having the second propagation direction.

13. The mode-selectable privacy display of claim 11, wherein the first directional scattering feature comprises a plurality of scattering elements spaced apart from one another along and across the light guide, the plurality of scattering elements being configured to scatter out a portion of the guided light having a first propagation direction within the light guide to provide the broad-angle emitted light during the public mode, a scattering element of the plurality of scattering elements having a size that is less than a size of a light valve of the light valve array.

14. The mode-selectable privacy display of claim 13, wherein a scattering element of the scattering element plurality comprises a diffraction grating configured to diffractively scatter out the portion of the guided light having the first propagation direction during the public mode.

15. The mode-selectable privacy display of claim 11, wherein the second directional scattering feature comprises a diffraction grating at a surface of the light guide, the diffraction grating being configured to diffractively scatter out a portion of the guided light having a second propagation direction to provide the directional emitted light during the privacy mode.

16. The mode-selectable privacy display of claim 15, wherein the diffraction grating of the second directional scattering feature comprises diffractive features having a feature spacing between adjacent diffractive features that decreases as a function of distance from a light-entrance edge of the light guide.

17. The mode-selectable privacy display of claim 11, wherein the first directional scattering feature is located at a first surface of the light guide and the second directional scattering feature is located at a second surface of the light guide opposite the first surface, the first directional scattering feature being configured to scatter out guided light through the second surface to provide the broad-angle emitted light.

18. A method of operating a mode-selectable backlight, the method comprising:
guiding light in a light guide as guided light;
scattering guided light out from within the light guide as broad-angle emitted light during a public mode using a first directional scattering feature, the guided light having a first propagation direction during the public mode; and
scattering guided light out from within the light guide as directional emitted light during a privacy mode using a second directional scattering feature, the guided light having a second propagation direction during the privacy mode,
wherein the directional emitted light is preferentially directed into a viewbox adjacent to the mode-selectable backlight, and wherein the first and second propagation directions are different from one another.

19. The method of operating a mode-selectable backlight of claim 18, further comprising providing light to the light guide to be guided as the guided light using a plurality of light sources, the plurality of light source comprising:
a first light source configured to provide the guided light having the first propagation direction within the light guide during the public mode; and
a second light source configured to provide guided light having the second propagation direction within the light guide during the privacy mode,
wherein the first light source is located on a first side of the light guide and the second light source is located on a second side of the light guide orthogonal to the first side.

20. The method of operating a mode-selectable backlight of claim 18, further comprising modulating light emitted by the mode-selectable backlight using an array of light valves to display an image, wherein during the public mode the array of light valves modulates the broad-angle emitted light to display the image as a public image and during the privacy mode the array of light valves modulates the directional emitted light to preferentially display the image within the viewbox as a private image.

* * * * *